United States Patent
Yoshida

(10) Patent No.: US 7,542,605 B2
(45) Date of Patent: Jun. 2, 2009

(54) IMAGE PROCESSING APPARATUS, CONTROL METHOD THEREFOR, AND PROGRAM

(75) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 11/154,679

(22) Filed: Jun. 17, 2005

(65) Prior Publication Data

US 2005/0286805 A1      Dec. 29, 2005

(30) Foreign Application Priority Data

Jun. 24, 2004    (JP)    ............... 2004-186476

(51) Int. Cl.
*G06K 9/34* (2006.01)
*G06K 9/46* (2006.01)
*G06K 9/66* (2006.01)

(52) U.S. Cl. .................... 382/176; 382/190

(58) Field of Classification Search .......... 382/305, 382/190, 176; 707/104.1
See application file for complete search history.

(56) References Cited

U.S. PATENT DOCUMENTS

| | | | | |
|---|---|---|---|---|
| 5,826,263 A | * | 10/1998 | Nakabayashi et al. | 707/7 |
| 5,933,823 A | * | 8/1999 | Cullen et al. | 707/6 |
| 6,798,913 B2 | * | 9/2004 | Toriyama | 382/229 |
| 2003/0182629 A1 | * | 9/2003 | Okamura | 715/525 |
| 2004/0223197 A1 | * | 11/2004 | Ohta et al. | 358/538 |
| 2005/0271296 A1 | | 12/2005 | Tsuji et al. | 382/275 |
| 2006/0008113 A1 | | 1/2006 | Matsukubo et al. | 382/100 |
| 2006/0008114 A1 | | 1/2006 | Sekiguchi et al. | 382/100 |
| 2006/0010115 A1 | | 1/2006 | Yoshida et al. | 707/3 |

FOREIGN PATENT DOCUMENTS

JP      2000-29873      1/2000

* cited by examiner

*Primary Examiner*—Bhavesh M Mehta
*Assistant Examiner*—John B Strege
(74) *Attorney, Agent, or Firm*—Fitzpatrick, Cella, Harper & Scinto

(57) ABSTRACT

Vector data conversion is executed at once for all the block images of blocks having a predetermined attribute in a plurality of read document images. A series of obtained vector data is output by a designated output method.

15 Claims, 26 Drawing Sheets

F I G. 5

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

*PROPERTY  1 : text   2 : picture   3 : table   4 : line   5 : photo

INPUT FILE INFORMATION

| TOTAL NUMBER OF BLOCKS | N(=6) |
|---|---|

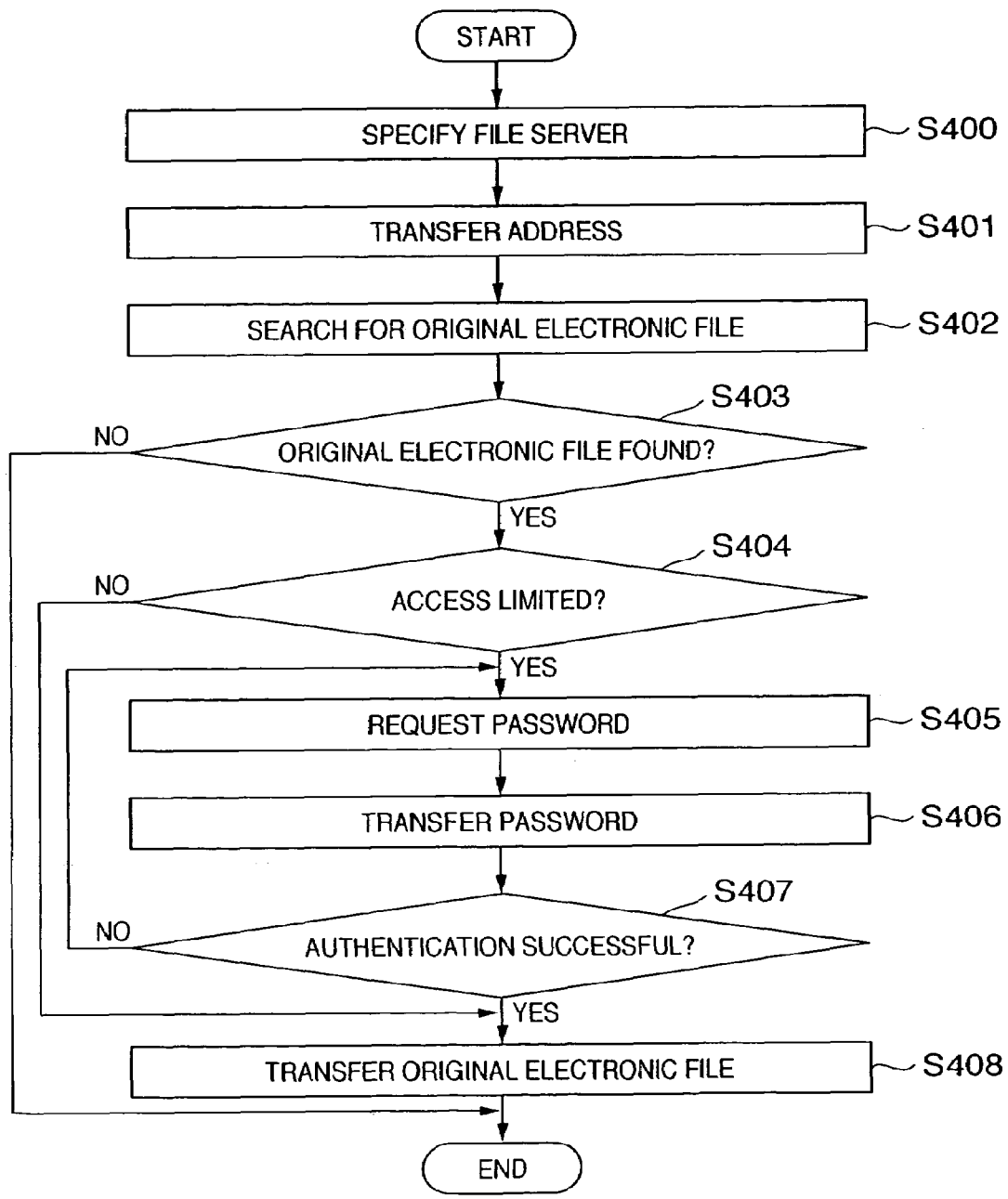

◆ DESIGNATE SCAN FINISHING

● TEXT OBJECT PROCESS

CREATE SEPARATE DOCUMENT EVERY SPECIFIC FONT ▼

3100 — SIZE          24   POINTS
3200 — COLOR        [▨▨▨]
3300 — DECORATION   ☐ B  ☐ I  ☐ U
3400 — CODE         [ + § ]

FIG. 22
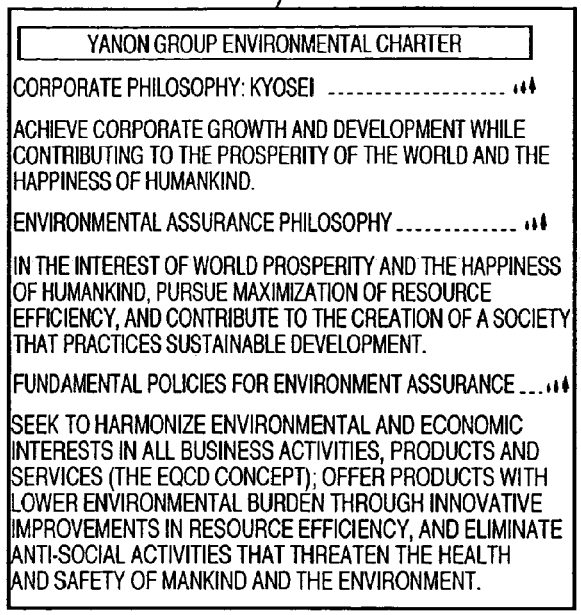
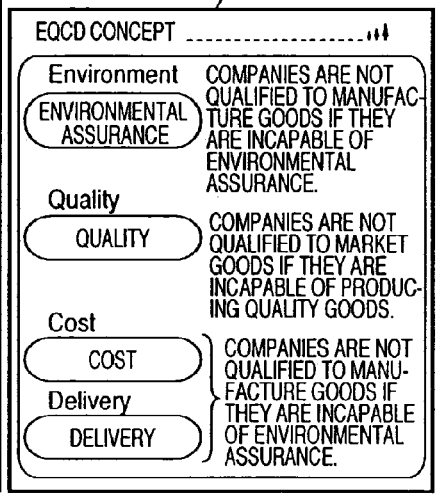
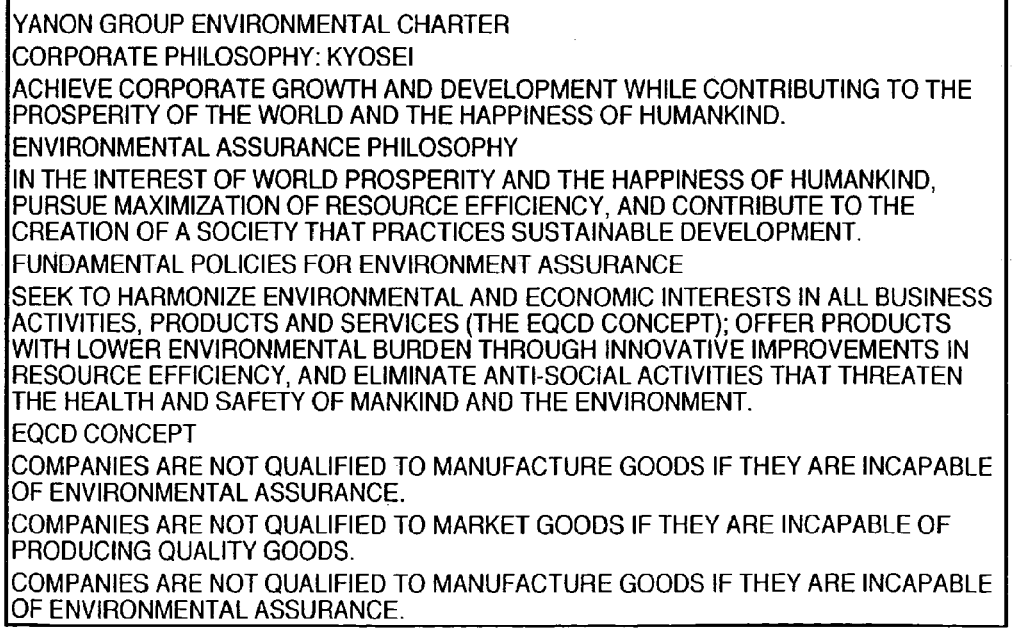

FIG. 23
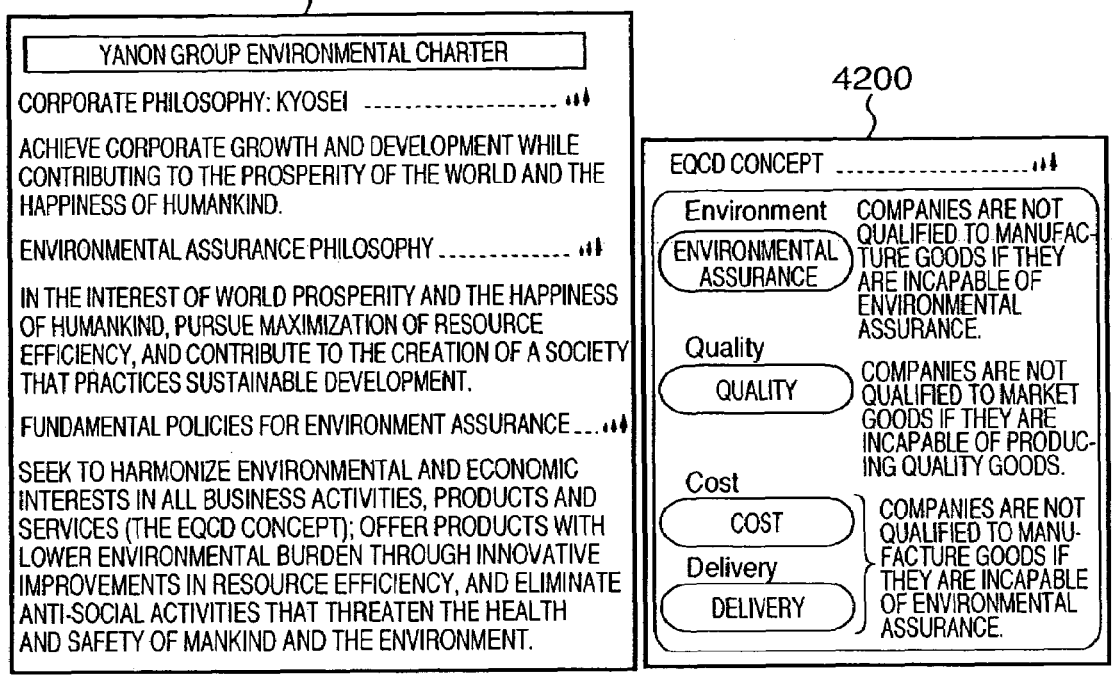
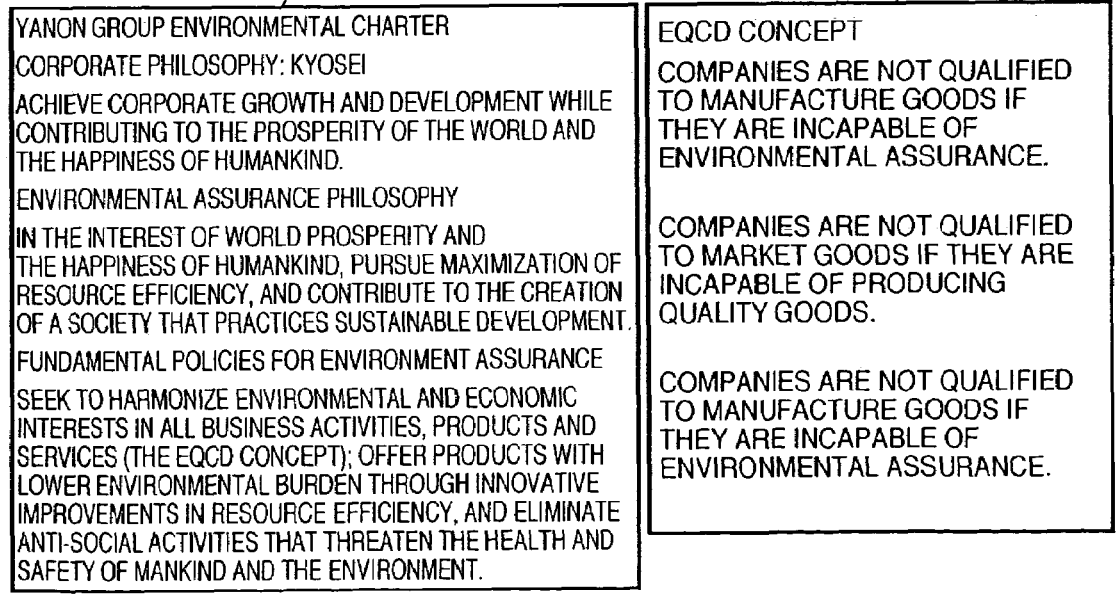

FIG. 25
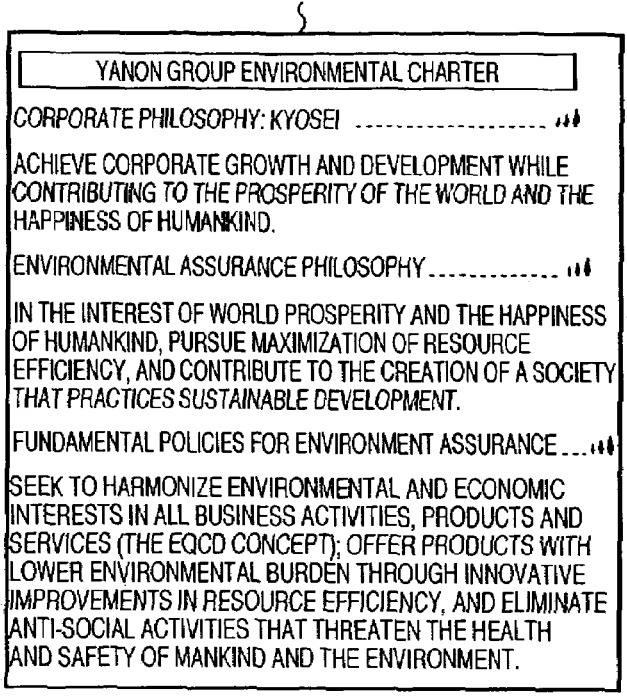
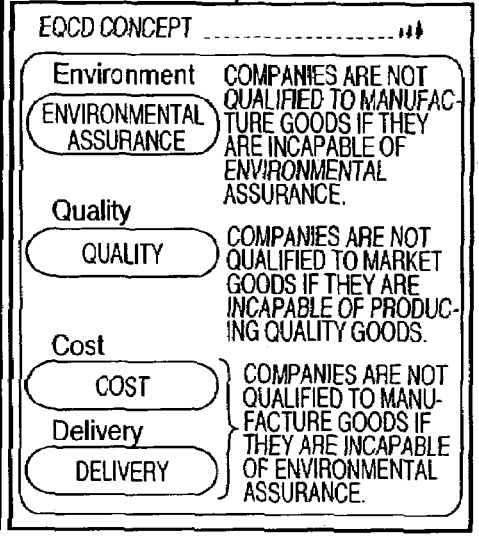
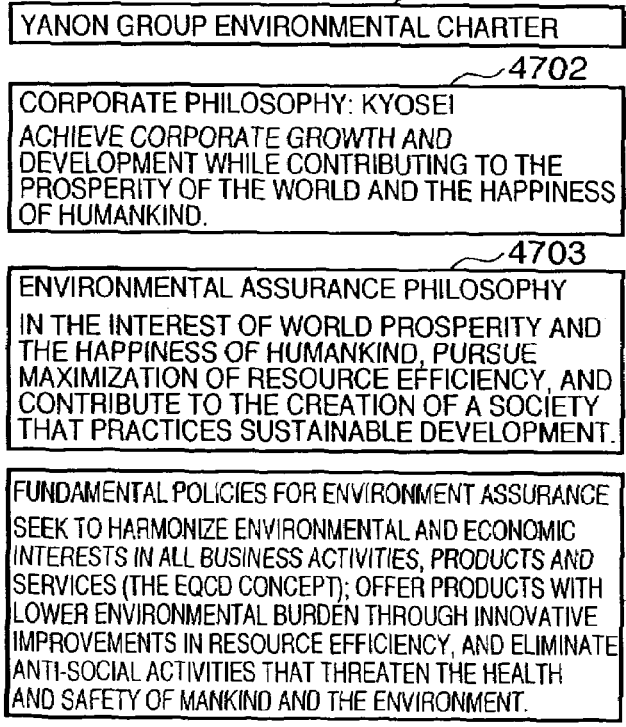
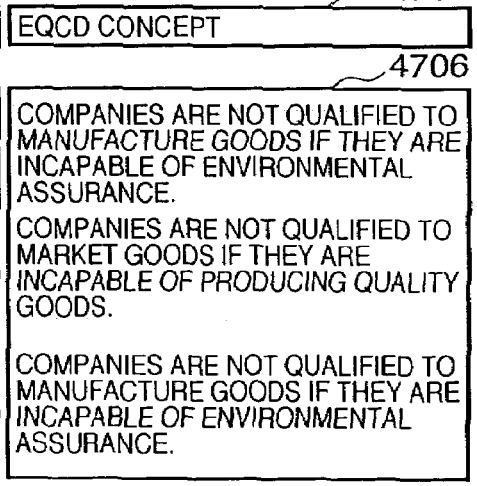

IMAGE PROCESSING APPARATUS, CONTROL METHOD THEREFOR, AND PROGRAM

FIELD OF THE INVENTION

The present invention relates to an image processing apparatus, control method therefor, and program which execute an image process for a document image or the like obtained by reading a document.

BACKGROUND OF THE INVENTION

As a conventional method of managing an image read by a reading unit such as a scanner, the read image is managed with a general-purpose image file format such as JPEG, TIFF, or PDF. As another management method, a text image part is extracted from a read image, undergoes OCR, and is managed as text codes. In addition, there is recently proposed a method of converting a read image into a vector format and managing the obtained vector data (e.g., Japanese Patent Laid-Open No. 2000-29873).

According to this method, a read image formed from vector data enables the user to operate objects which are decomposed on the basis of an attribute in the read image. This method has an advantage to facilitate reuse of a read image, and has received a great deal of attention.

In practice, however, the method of managing a read image as vector data provides only the definition of the format, and no actual user-oriented usage is proposed.

SUMMARY OF THE INVENTION

The present invention has been made to solve the above-mentioned problems, and has as its object to provide an image processing apparatus, control method therefor, and program which can provide information in a plurality of document images with a reusable output form corresponding to the application purpose of the user.

According to the present invention, the foregoing object is attained by providing an image processing apparatus which performs an image process for a document image obtained by reading a document, comprising:

a reading unit, adapted to read a document;

a converting unit, adapted to convert a document image into vector data;

an executing unit, adapted to execute conversion by the converting unit at once for block images of blocks having a predetermined attribute in a plurality of document images read by the reading unit; and an output unit, adapted to output by a designated output method a series of vector data obtained by execution of the executing unit.

In a preferred embodiment, the predetermined attribute includes one of a text and an image.

In a preferred embodiment, when the predetermined attribute is a text, the converting unit comprises a character recognizing unit, adapted to recognize a text image in a text block having the text attribute in the document image.

In a preferred embodiment, the output method outputs the series of vector data as one vector data file.

In a preferred embodiment, the output method divides the series of vector data on the basis of a designated dividing condition and outputs the series of vector data as separate vector data files.

In a preferred embodiment, the dividing condition includes a page break position.

In a preferred embodiment, the dividing condition includes a position of not less than a predetermined number of blank lines in the document image.

In a preferred embodiment, the dividing condition includes a position corresponding to designated font type information.

In a preferred embodiment, the font type information includes at least one of a font size, a color, decoration, and a code.

In a preferred embodiment, the apparatus further comprises a designating unit, adapted to designate the output method.

In a preferred embodiment, the apparatus further comprises:

a dividing unit, adapted to divide the document image into a plurality of blocks of respective attributes;

a generating unit, adapted to generate block information including an ID which specifies each of the blocks divided by the dividing unit; and a storage unit, adapted to store the block information generated by the generating unit.

In a preferred embodiment, the block information includes relative position information of a block with respect to another block.

In a preferred embodiment, the block information includes absolute position coordinates of a block with respect to a document image including the block.

In a preferred embodiment, the block information includes an order of a block with respect to all blocks in a document image including the block.

In a preferred embodiment, the apparatus further comprises an image output unit, adapted to output an image corresponding to the document image by using the block information stored in the storage unit.

In a preferred embodiment, when a plurality of identical blocks determined to be identical blocks exist in the document image, the generating unit generates first block information for one identical block among the plurality of identical blocks, and for the remaining identical blocks, generates second block information containing reference information used to refer to the first block information.

According to the present invention, the foregoing object is attained by providing a method of controlling an image processing apparatus which performs an image process for a document image obtained by reading a document, comprising:

a reading step of reading a document;

a converting step of converting a document image into vector data;

an executing step of executing conversion in the converting step at once for block images of blocks having a predetermined attribute in a plurality of document images read in the reading step; and an output step of outputting by a designated output method a series of vector data obtained by execution of the executing step.

According to the present invention, the foregoing object is attained by providing a program for implementing control of an image processing apparatus which performs an image process for a document image obtained by reading a document, comprising:

a program code for a reading step of reading a document;

a program code for a converting step of converting a document image into vector data;

a program code for an executing step of executing conversion in the converting step at once for block images of blocks having a predetermined attribute in a plurality of document images read in the reading step; and a program code for an output step of outputting by a designated output method a series of vector data obtained by execution of the executing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention, and together with the description, serve to explain the principles of the invention.

FIG. 5 is a table showing an example of block information according to the embodiment of the present invention;

FIG. 9 is a flowchart showing an application of the original electronic file search process according to the embodiment of the present invention;

FIG. 21 is a view showing an example of a font type information designation window according to the embodiment of the present invention;

FIG. 22 is a view showing an output example by operation via the operation window according to the embodiment of the present invention;

FIG. 23 is a view showing another output example by operation via the operation window according to the embodiment of the present invention;

FIG. 25 is a view showing still another output example by operation via the operation window according to the embodiment of the present invention.

DETAILED DESCRIPTION OF THE PREFERRED EMBODIMENT

A preferred embodiment of the present invention will be described in accordance with the accompanying drawings.

Embodiment

Figure 1:
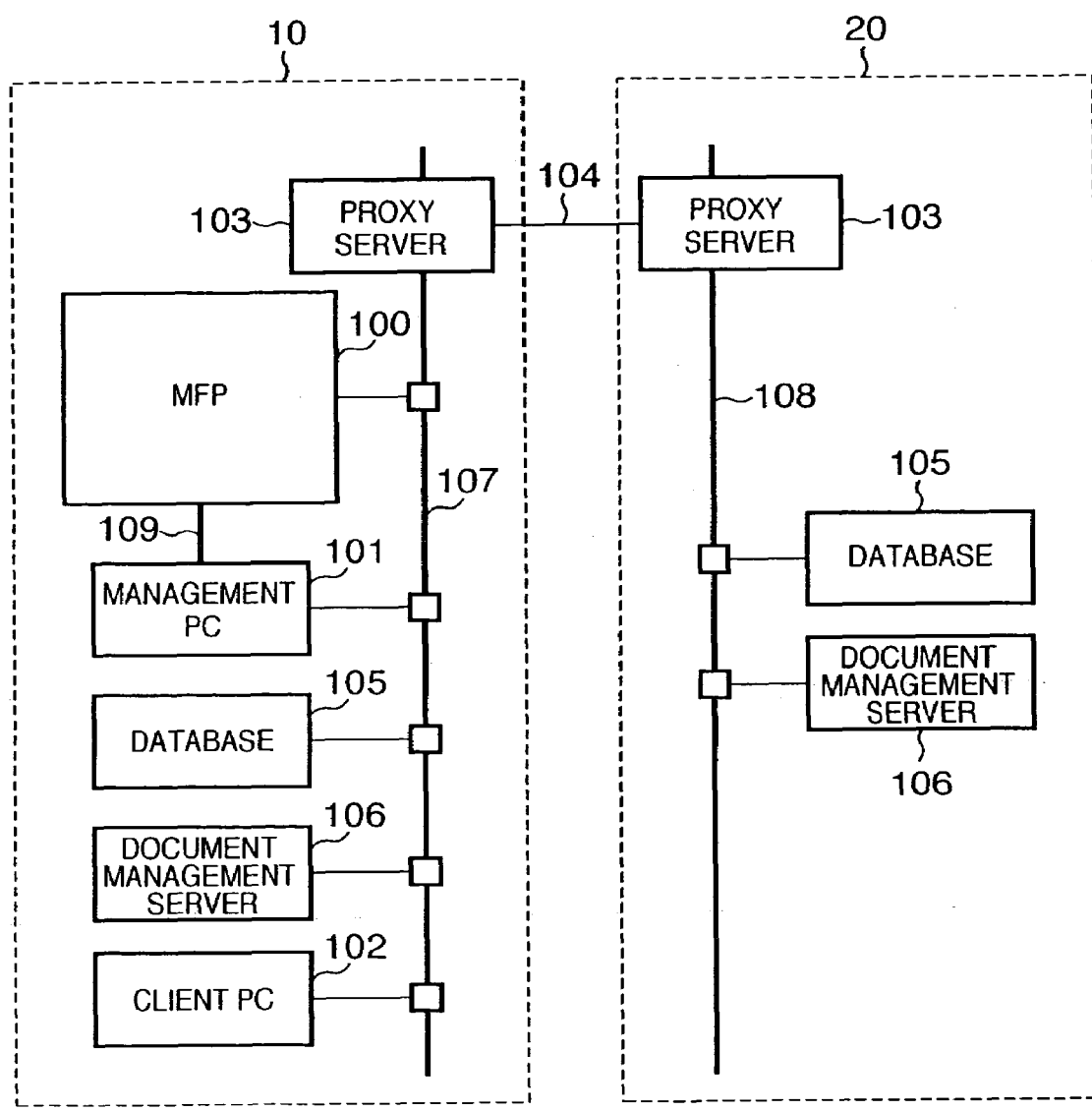
FIG. 1 is a block diagram showing the arrangement of an image processing system according to an embodiment of the present invention.

FIG. 1 is a block diagram showing the arrangement of an image processing system according to the embodiment of the present invention.

The image processing system is implemented in an environment where offices 10 and 20 are connected by a network 104 such as the Internet.

A LAN 107 constructed in the office 10 is connected to an MFP (Multi Function Peripheral) 100 which realizes a plurality of types of functions (copying function, printing function, transmitting function, and the like), a management PC 101 which controls the MFP 100, a client PC 102 which utilizes the MFP 100, a document management server 106, a database 105 for the server 106, and a proxy server 103.

A LAN 108 constructed in the office 20 is connected to the proxy server 103, the document management server 106, and the database 105 for the server 106.

The LAN 107 in the office 10 and the LAN 108 in the office 20 are connected to the network 104 via the proxy servers 103 of the two offices.

The MFP 100 comprises an image reading unit which electronically reads particularly a paper document, and an image processing unit which executes an image process for an image signal obtained from the image reading unit. The image signal can be transmitted to the management PC 101 via a LAN 109.

The management PC 101 is a general PC (personal computer), and incorporates various components such as an image storage unit, image processing unit, display unit, and input unit. Some of the components are integrated into the MFP 100.

Note that the arrangement in FIG. 1 is merely an example. The office 20 with the document management server 106 may be omitted, a plurality of offices 20 may be provided, or the offices 10 and 20 may be connected to each other on the single LAN.

The network 104 is a so-called communication network which is typically realized by one or a combination of the Internet, LAN, WAN, telephone line, dedicated digital circuit, ATM, frame relay line, communication satellite channel, cable television line, data broadcasting radio channel, and the like as far as the network enables data exchange.

Various terminals such as the management PC 101, client PC 102, and document management server 106 each have components (e.g., a CPU, RAM, ROM, hard disk, external storage, network interface, display, keyboard, and mouse) which are standard equipment for a general-purpose computer.

The detailed arrangement of the MFP 100 will be explained with reference to FIG. 2.

Figure 2:
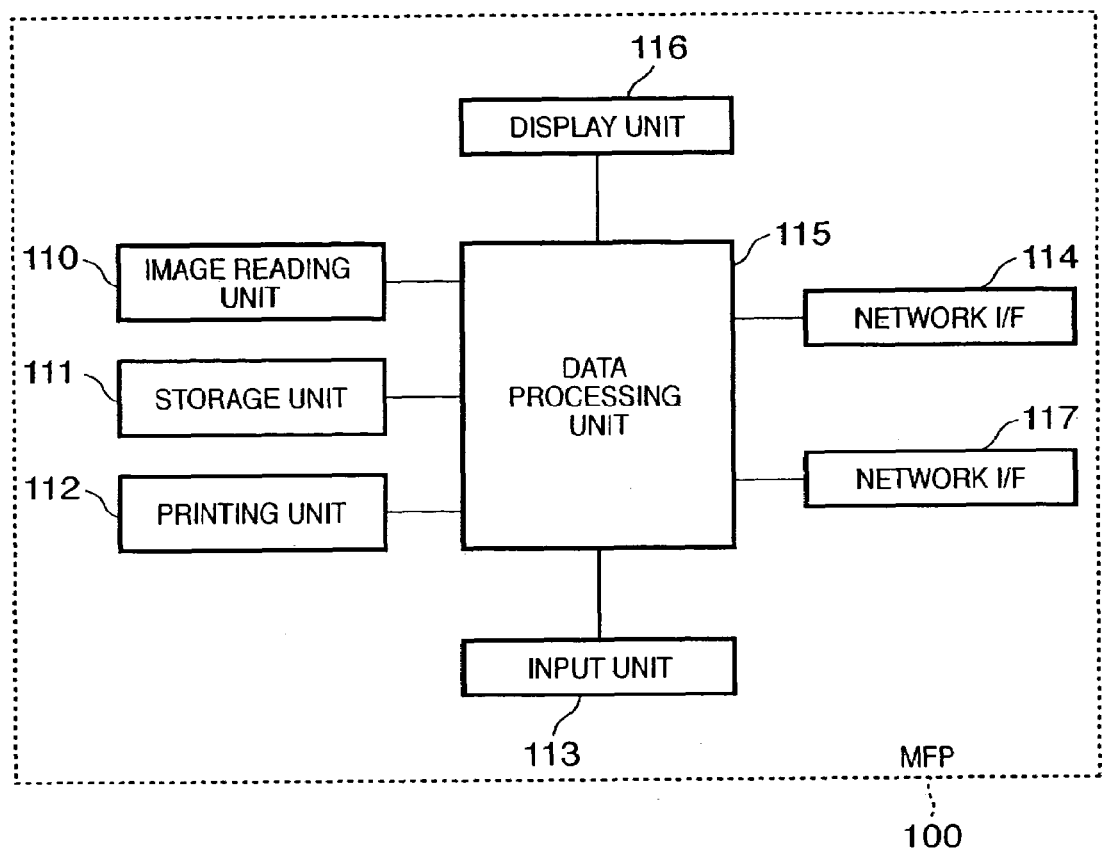
FIG. 2 is a block diagram showing the detailed arrangement of an MFP according to the embodiment of the present invention.

FIG. 2 is a block diagram showing the detailed arrangement of the MFP according to the embodiment of the present invention.

In FIG. 2, an image reading unit 110 including an auto document feeder (ADF) irradiates a bundle or one of document images with a light source (not shown), forms a reflected document image on a solid-state image sensing element via a lens, and obtains a raster image reading signal from the solid-state image sensing element as a raster image at a predetermined density (600 dpi or the like).

The MFP 100 has a copying function of printing an image corresponding to an image reading signal on a printing medium by a printing unit 112. To form a copy of a document image, the image reading signal is processed by a data processing unit 115 to generate a printing signal, and the printing signal is printed on a printing medium by the printing unit 112. To form copies of a document image, a printing signal for one page is temporarily stored and held in a storage unit 111, and such printing signals are sequentially output to the printing unit 112 to print them on printing media.

With the transmitting function via a network I/F 114, a raster image obtained from the image reading unit 110 is converted into an image file of a compressed image file format (e.g., TIFF or JPEG) or a vector data file format (e.g., PDF), and the image file is output from the network I/F 114. The output image file is transmitted to the document management server 106 via the LAN 107 or further transferred to the other document management server 106 or client PC 102 via the network 104.

With the printing function by the printing unit 112, for example, printing data output from the client PC 102 is received by the data processing unit 115 via the network I/F 114. The data processing unit 115 converts the printing data into raster data printable by the printing unit 112, and the printing unit 112 forms the image on a printing medium.

An instruction from the operator to the MFP 100 is input from an input unit 113 formed from a key operation unit attached to the MFP 100 and a keyboard and mouse connected to the management PC 101. The series of operations are controlled by a control unit (not shown) in the data processing unit 115. The state of an operation input and image data in process are displayed on a display unit 116.

The storage unit 111 is also controlled by the management PC 101, and data exchange and control between the MFP 100 and the management PC 101 are performed via a network I/F 117 and the LAN 109.

If the LAN 109 is provided, the data exchange and control between the MFP 100 and the management PC 101 are realized by directly connecting the MFP 100 and management PC 101 via the network I/F 117. Otherwise, these functions are realized Via the LAN 107 connected to the network I/F 114.

[Outline of Process]

The outline of an overall process executed by the image processing system according to the embodiment will be described with reference to FIG. 3.

Figure 3:
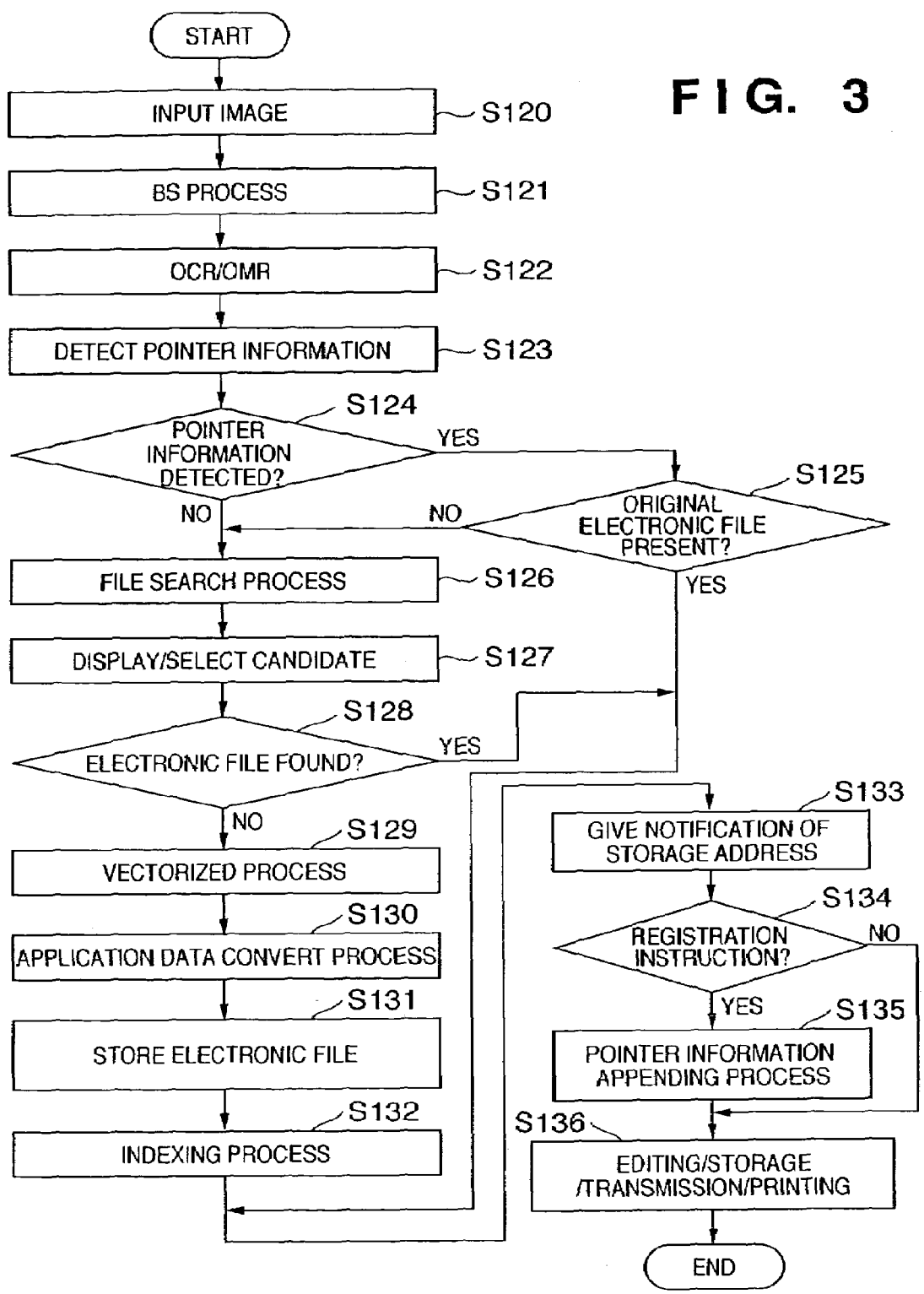
FIG. 3 is a flowchart showing the outline of an overall process executed by the image processing system according to the embodiment of the present invention.

FIG. 3 is a flowchart showing the outline of the overall process executed by the image processing system according to the embodiment of the present invention.

In step S120, the image reading unit 110 of the MFP 100 raster-scans and reads a document to obtain an 8-bit image signal of 600 dpi. The image signal undergoes a pre-process by the data processing unit 115 and is stored as image data for one page in the storage unit 111.

In step S121, the data processing unit 115 performs a block selection (BS) process. This process is executed under the control of the management PC 101.

More specifically, the CPU of the management PC 101 divides the image signal to be processed that is stored in the storage unit 111, into a text/line image part and halftone image part. The CPU further divides the text/line part into blocks of paragraphs, or tables or graphics formed by lines.

The CPU divides the halftone image part into independent objects (blocks) for so-called blocks (e.g., image parts and background parts of rectangular blocks).

For each of blocks generated by this BS process, block information, i.e., information that pertains to the block is generated, as will be described later in detail.

In step S122, an object (block) corresponding to a two-dimensional barcode or URL (or URI (Uniform Resource Identifier)), which is recorded in the document image as additional information, is detected. If the additional information is a URL image, the URL image undergoes character recognition by OCR. On the other hand, if the additional information is a two-dimensional barcode image, the two-dimensional barcode image undergoes mark decoding by OMR (Optical Mark Recognition).

In step S122, each text block obtained in the BS process in step S121 undergoes character recognition by OCR.

In step S123, pointer information indicating a storage destination where an original electronic file of the read document image is stored is detected on the basis of the process result of step S122.

In step S124, it is determined whether any pointer information is detected. If no pointer information is detected (NO in step S124), the flow advances to step S126. On the other hand, if pointer information is detected (YES in step S124), the flow advances to step S125 to determine whether the original electronic file is present at the storage destination indicated by the pointer information.

The original electronic file is stored in, e.g., a hard disk within the client PC 102 in FIG. 1, the database 105, or the storage unit 111 of the MFP 100 itself. The original electronic file is searched for in these storages in accordance with the pointer information detected in step S123.

If no original electronic file is found in step S125 (NO in step S125), the flow advances to step S126. On the other hand, if the original electronic file is found (YES in step S125), the flow advances to step S133.

Even if the original electronic file is found in step S125, the flow advances to step S126 when the original electronic file is image data typified by PDF or TIFF. On the other hand, if the found original electronic file is vector data previously generated in this process, the flow advances to step S133.

In step S126, a file search process of searching for an electronic file similar to the read document image input in step S120 is performed on the basis of the read document image input in step S120.

In the file search process, a full-text search is performed by extracting words from the result of the OCR process performed for the text blocks in step S122 and searching for an electronic file containing the words. Alternatively, a layout search is performed by searching for an electronic file having a layout specified by the arrangement and attributes (image, text, or the like) of blocks in an image signal (or a similar layout).

In step S127, electronic files obtained as the search result of the file search process are displayed on the display unit 116 as candidates for the electronic file (or its thumbnail image (representative image)) corresponding to the read document image to accept selection of an electronic file to be processed from the candidates.

If there is only one candidate, the flow automatically advances from step S128 to step S133.

In step S128, it is determined whether one is selected from the electronic file candidates displayed on the display unit 116. If any electronic file is selected (YES in step S128), the flow advances to step S133. On the other hand, if no electronic file is selected (NO in step S128), the flow advances to step S129.

Even when any electronic file is selected in step S128, the flow advances to step S129 when the electronic file is image data typified by PDF or TIFF.

In step S129, a vectorized process of converting image data (the electronic file of the read document image (image data) input in step S120 or the electronic file of image data selected in step S127) into vector data is executed.

In the vectorized process, the size, style, and font of characters are further recognized for each text block having undergone the OCR process in step S122. The text block is converted into font data visually faithful to characters obtained by scanning the document. Table and graphic blocks formed from lines are converted into outline data. Image blocks are converted into separate JPEG files as image data.

The vectorized process for these blocks is performed for each block on the basis of its block information. Also, the layout information of the block is stored.

In step S130, an application data convert process of converting vector data obtained in step S129 into application data of a predetermined format (e.g., an RTF format) which can be processed by a word processing application is executed. In step S131, the generated application data is stored in the storage unit 111, document management server 106, or the like as an electronic file corresponding to the image data input in step S120.

In step S132, in order to allow a direct search for an electronic file corresponding to a read document image upon performing a similar process, an indexing process of generating index information for electronic file search is executed. Generated index information is appended to, e.g., a search index file managed by the storage unit 111.

In step S133, the display unit 116 is notified of the storage address of the original electronic file found in step S125, the storage address of the electronic file selected in step S128, or the storage address of the electronic file stored in step S131.

In step S134, it is determined whether an operation instruction from the input unit 113 is a read document image registration instruction. If it is not the read document image registration instruction (NO in step S134), the flow advances to step S136. On the other hand, if it is the read document image registration instruction (YES in step S134), the flow advances to step S135.

The process in step S134 determines the presence/absence of an instruction to execute registration operation. The registration operation is performed when the user wants to register, as an original electronic file, image information/vector data/ an electronic file selected in step S128 of a read document image which contains no pointer information in order to reuse the read document image in the image processing system.

For this reason, if the read document image contains pointer information, the registration operation may not be performed. Even when the read document image contains pointer information, and an original electronic file corresponding to the read document image is already present, the user may want to register the read document image again depending on the application purpose. Thus, the registration operation is not limited to a read document image which contains no pointer information.

If an instruction for copying a read document image (printing apparatus) is issued instead of one for the registration operation, the original electronic file may be registered and at the same time may be copied (printed) as a print of the read document image.

In step S135, a pointer information appending process is performed to generate pointer information for a read document image to be registered and append the pointer information as image data to an original electronic file corresponding to the read document image.

The original electronic file to which the pointer information is appended is stored in, e.g., the hard disk in the client PC 102 in FIG. 1, the database 105, or the storage unit 111 of the MFP 100 itself. Simultaneously with the storage, the original electronic file may be printed from the printing unit 112.

In step S136, an operation window is presented on the display unit 116 to perform various kinds of processes (e.g., edit/storage/transmission (FAX transmission, e-mail transmission, or file transmission)/printing) for the original electronic file corresponding to the read document image. Various kinds of processes for the original electronic file can be performed via the operation window.

In the case of printing (copying) out of these kinds of processes, the original electronic file undergoes image processes such as a color process and spatial frequency correction suitable for each object and then is printed from the printing unit 112. In the case of storage, the original electronic file is stored in the storage unit 111. In the case of transmission (file transmission), the original electronic file is converted into a general file format reusable at a file destination such as RTF (Rich Text Format) or SVG and is sent to the file destination (e.g., the client PC 102) via the network I/F 114.

In this manner, the image processing system generally manages vector data as an original electronic file corresponding to a read document image, and can perform various kinds of processes using the vector data. Accordingly, the information amount of data to be processed can be reduced, and the storage efficiency can be increased. The transmission time can be shortened, and the original electronic file can be output as a high-quality image in outputting (display/printing).

[Details of Each Process]

Details of each process will be explained.

[Block Selection Process]

Details of the BS process in step S121 will be described first.

Figure 4B:
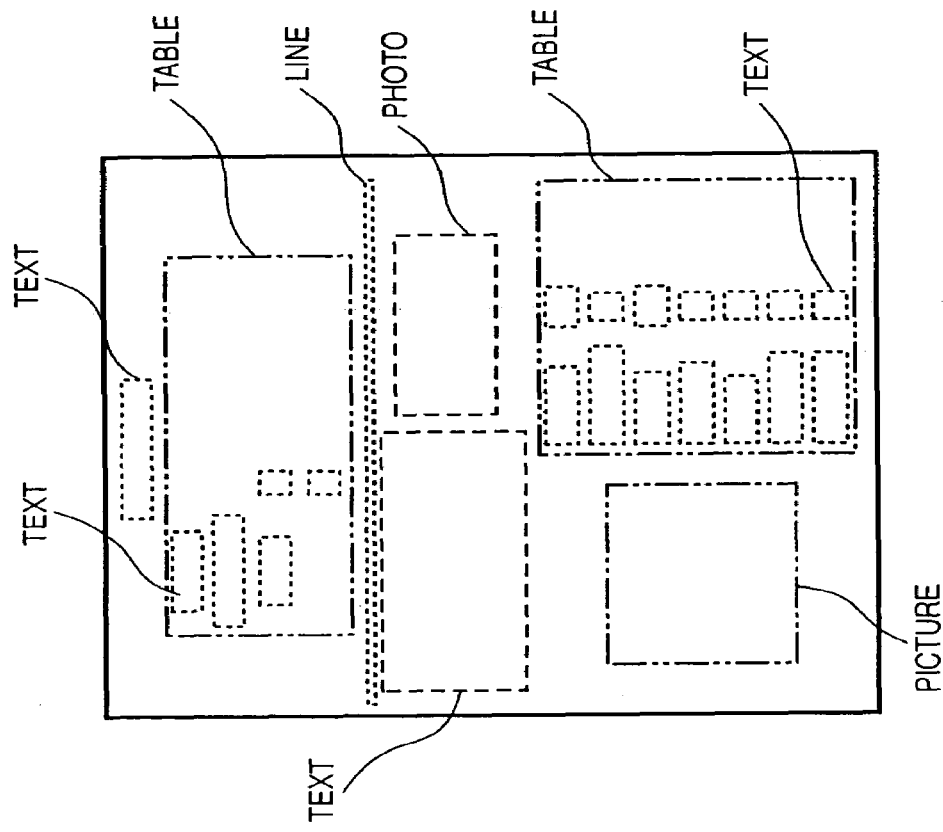
FIG. 4B is a view for explaining the concept of the block selection process according to the embodiment of the present invention.
Figure 4A:
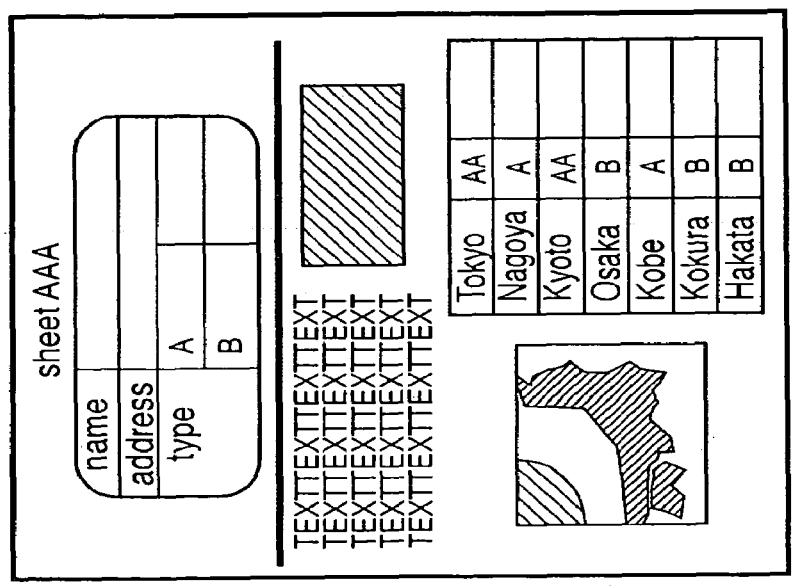
FIG. 4A is a view for explaining the concept of a block selection process according to the embodiment of the present invention.

In the BS process, for example, a raster image in FIG. 4A is recognized as meaningful blocks, as shown in FIG. 4B. The attributes (e.g., text/picture/photo/line/table) of the blocks are determined, and the image is divided into blocks having different attributes.

An example of the BS process will be described below.

An input image is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into blocks having different attributes. For example, a block having an aspect ratio of almost 1 and a size of a predetermined range is defined as a pixel cluster corresponding to a text. A part of adjacent characters which can be neatly grouped is defined as a text block. A plane pixel cluster is defined as a line block. A range of a black pixel cluster which neatly contains rectangular white pixel clusters with a predetermined size or more is defined as a table block. A region where indefinite pixel clusters scatter is defined as a photo block. A pixel cluster with another arbitrary shape is defined as a picture block.

In the BS process, a block ID which identifies each block is issued, and the attribute (image, text, or the like) of each block, the size, the order, the position (layout information (e.g., relative position coordinates which define the relative positional relationship between blocks or absolute position coordinates which define the absolute positional relationship between an original document and its blocks)) in the original document, and the block are associated and stored as block information in the storage unit 111. The block information is used in the vectorized process in step S129 and the indexing process in step S132 (to be described later in detail).

An example of block information will be described with reference to FIG. 5.

FIG. 5 is a table showing an example of block information according to the embodiment of the present invention.

As shown in FIG. 5, the block information comprises a block attribute which indicates the attribute of each block (1: text; 2: picture; 3: table; 4: line; and 5: photo), block position coordinates (X,Y), a block width W, a block height H, and the presence/absence of block OCR information (text data).

The block position coordinates (X,Y) indicate, e.g., position coordinates using those of the upper left corner of a document image as a start point (0,0). Each of the width W and height H is represented by, e.g., the number of pixels. In the BS process, input file information indicating the number N of blocks present in a document image (input file) is generated in addition to the block information. In the example of FIG. 5, the input file information N becomes equal to 6.

[OCR/OMR Process (Pointer Information Detection Process)]

Details of the process in step S122 of FIG. 3 will be described with reference to FIG. 6.

Figure 6:
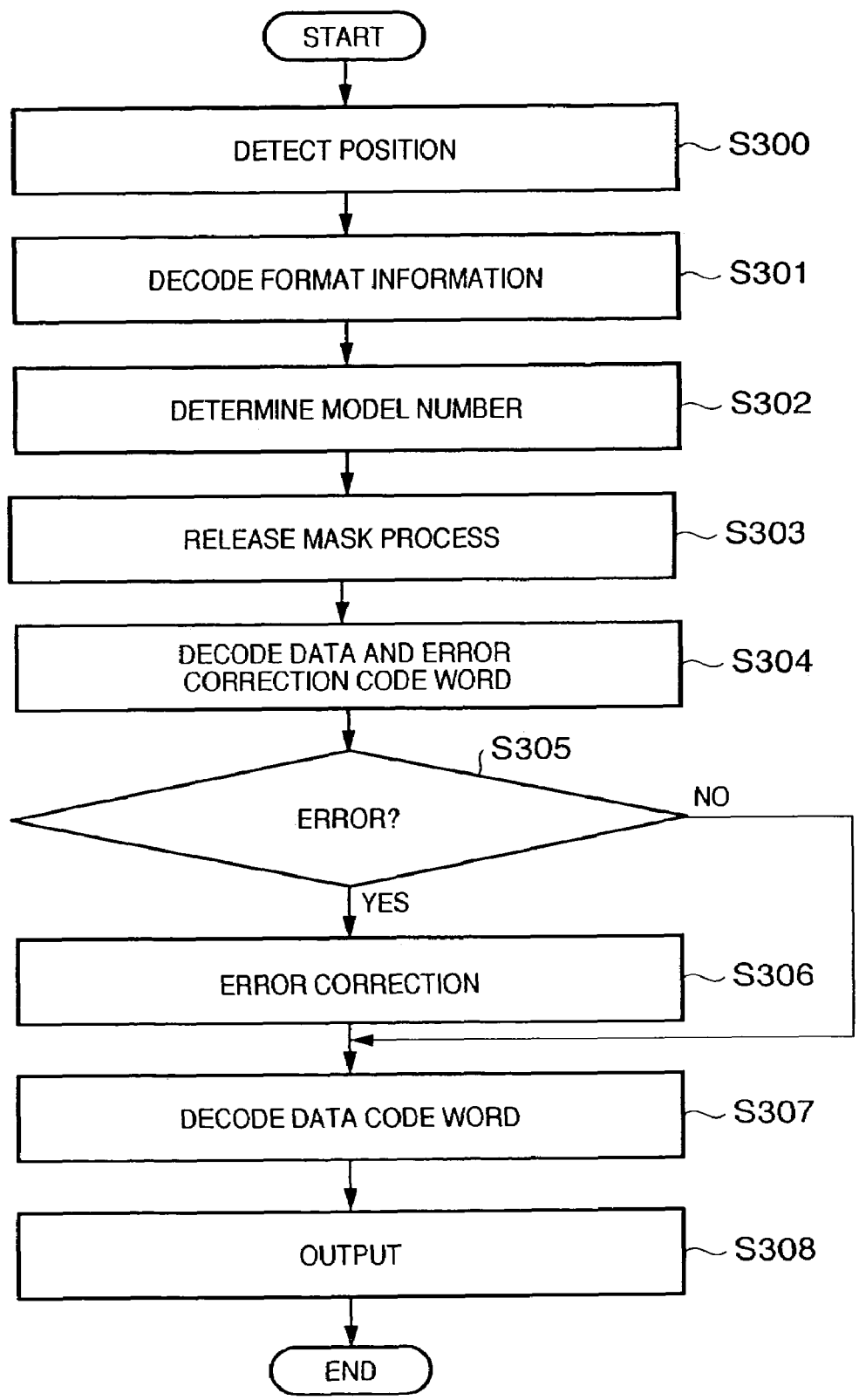
FIG. 6 is a flowchart showing details of a process in step S122 according to the embodiment of the present invention.

FIG. 6 is a flowchart showing details of the process in step S122 according to the embodiment of the present invention.

Figure 7:
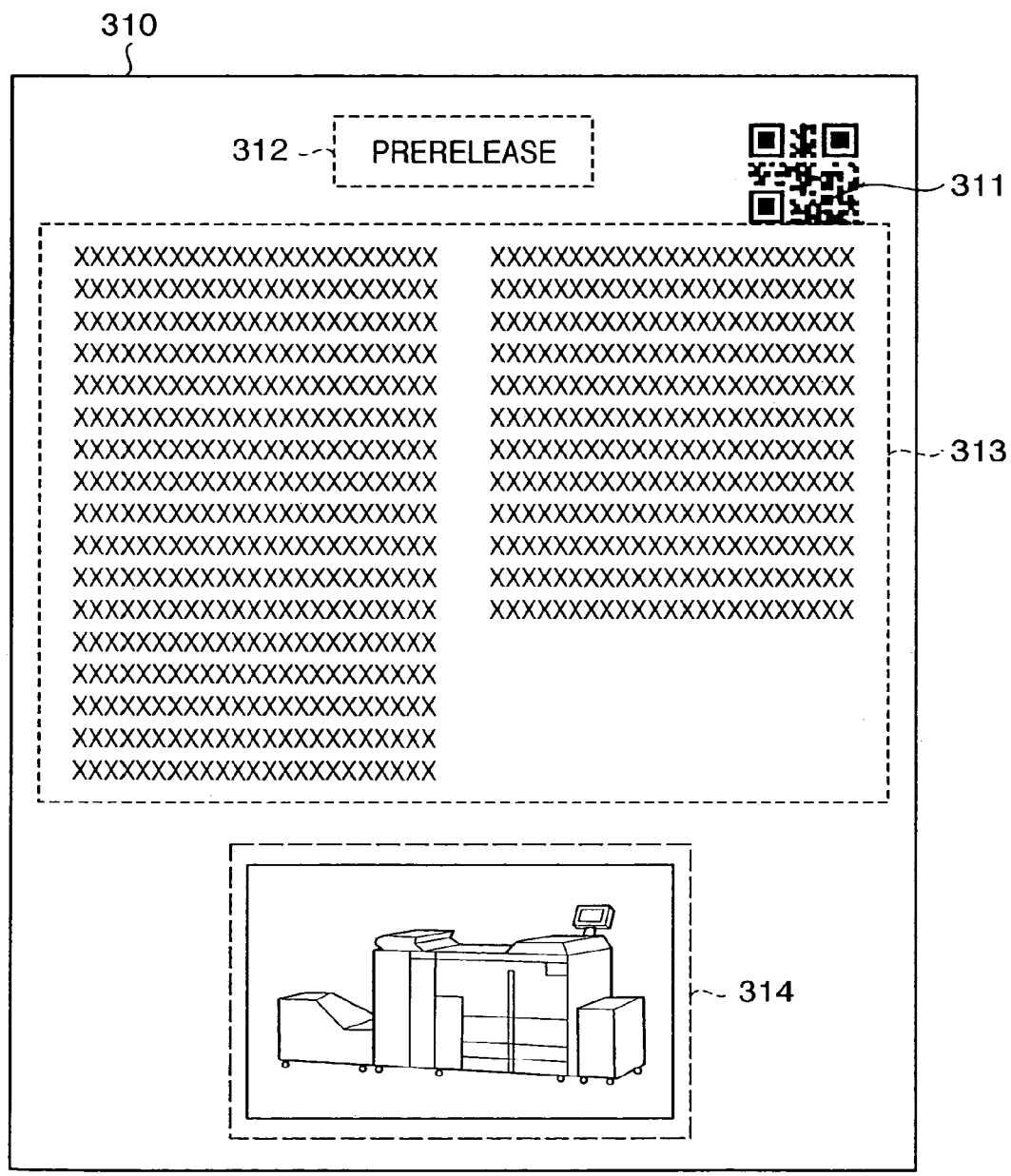
FIG. 7 is a view showing an example of a document image according to the embodiment of the present invention.

Referring to FIG. 6, a process of decoding a two-dimensional barcode (e.g., a QR code symbol) 311 appended into a document image 310 as shown in FIG. 7 and outputting a data character string will be described.

In step S300, a CPU (not shown) scans an image that represents the document image 310 stored in a page memory in the data processing unit 115, and detects the position of the predetermined two-dimensional barcode symbol 311 (block) from the result of the above-mentioned BS process.

Particularly in the embodiment, a position detection pattern of a QR code serving as the two-dimensional barcode symbol 311 comprises identical position detection element patterns, which are located at three out of four corners of the two-dimensional barcode symbol 311. For this purpose, in the embodiment, the position of the two-dimensional barcode symbol 311 is detected by detecting the position detection pattern.

Next, in step S301, format information that neighbors the position detection pattern is decoded to obtain an error correction level and mask pattern applied to the symbol.

In step S302, a model number which specifies the two-dimensional barcode symbol 311 is determined. After that, in step S303, an encoded region bit pattern is XORed using the mask pattern obtained from the format information, thus releasing the mask process.

In step S304, a symbol character is read in accordance with the layout rule corresponding to the model so as to decode a data code word and error correction code word of the two-dimensional barcode symbol 311.

In step S305, it is determined whether the decoded error correction code word includes an error. If no error is detected (NO in step S305), the flow advances to step S307; otherwise (YES in step S305), the flow advances to step S306 to correct the error.

In step S307, the data code word is divided into segments on the basis of a mode indicator and character count indicator from the error-corrected data.

Finally, in step S308, data characters are decoded on the basis of a mode used, thus outputting the decoding result.

Note that information to be encoded in the two-dimensional barcode represents address information (pointer information) of the corresponding electronic file, which is URL (URI) or full path information indicating the storage destination of an electronic file formed from a server name, directory, and file name.

In the embodiment, the document image 310 to which the pointer information is appended as the two-dimensional barcode has been described. Alternatively, the pointer information may be directly printed as a character string on the document image 310. In this case, a text block according to a predetermined rule is detected by the above BS process, and characters in the text image that indicates the pointer information undergo character recognition, thus directly obtaining the address information of the original electronic file.

Furthermore, the pointer information may be embedded in the document 310 by applying imperceptible modulation to, e.g., the spacings between neighboring characters in a text block 312 or 313 of the document image 310 shown in FIG. 7 and embedding information in the character spacings. In this case, when the character spacings are detected upon executing a character recognition process (to be described later), pointer information can be obtained. Also, the pointer information can be assigned as a digital watermark in a natural image 314.

[Search Process]

An original electronic file search process based on the pointer information in step S125 of FIG. 3 will be described below using the flowchart of FIG. 8.

Figure 8:
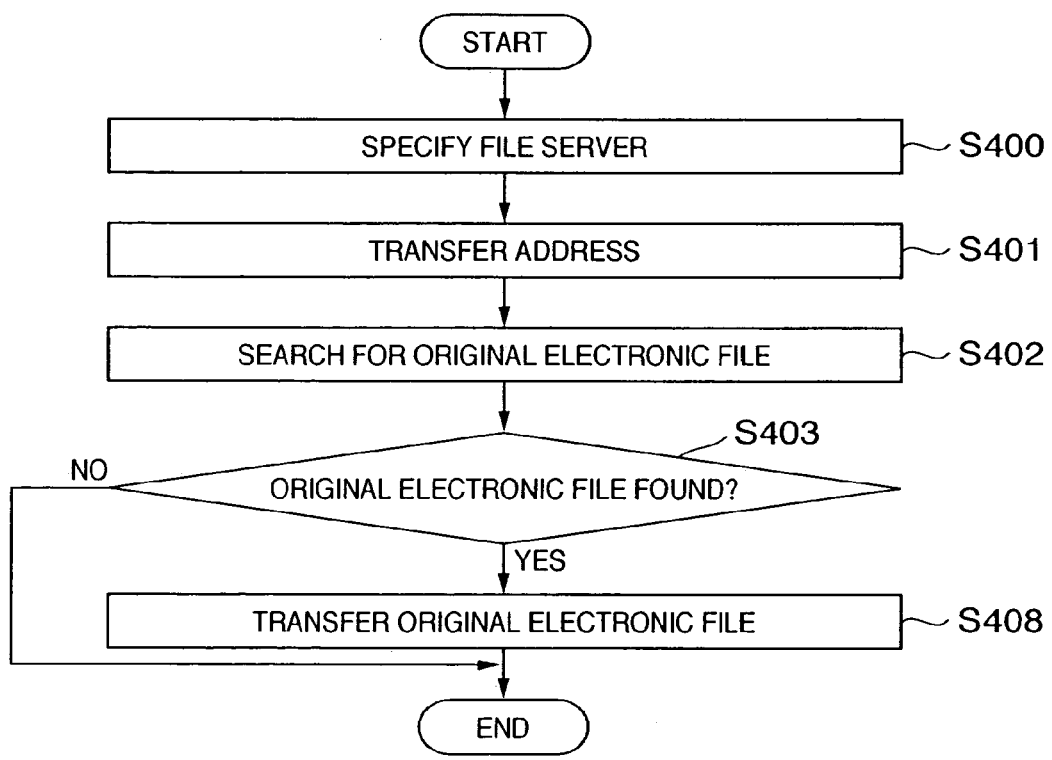
FIG. 8 is a flowchart showing an original electronic file search process according to the embodiment of the present invention.

FIG. 8 is a flowchart showing the original electronic file search process according to the embodiment of the present invention.

In step S400, the MFP 100 specifies a file server serving as the storage destination of an electronic file on the basis of the address information in the pointer information.

Note that the file server indicates the client PC 102, the document management server 106 that manages the database 105, or the MFP 100 itself that incorporates the storage unit 111.

In step S401, the MFP 100 transfers the address information to the specified file server.

In step S402, upon reception of the address information, the file server searches for the corresponding original electronic file. In step S403, it is determined whether the original electronic file exists. If the original electronic file is not found (NO in step S403), the file server sends a message that advises the absence of the file to the MFP 100.

On the other hand, if the original electronic file is found (YES in step S403), the flow advances to step S408. The file server notifies the MFP 100 of the address of the original electronic file and transfers the original electronic file to the MFP 100.

To increase security in the process of FIG. 8, authentication of the user who requests the original electronic file may be performed as shown in FIG. 9. That is, reuse, by a third party, of some of original electronic files to be processed must often be limited. The process in FIG. 8 has been explained under the condition that all original electronic files stored in the file server can be freely accessed, and the entire file or some objects of the file are reusable.

A case will be described with reference to FIG. 9 wherein access to an original electronic file is limited differently for each user.

FIG. 9 is a flowchart showing an application of the original electronic file search process according to the embodiment of the present invention.

In the process of FIG. 9, the same step numbers as those in the process of FIG. 8 denote the same processes, and a description thereof will be omitted.

Referring to FIG. 9, if the original electronic file is found in step S403, it is determined in step S404 whether the access to the original electronic file is limited. If the access is not limited (NO in step S404), the flow advances to step S408. If the access is limited (YES in step S404), the flow advances to step S405. In step S405, the MFP 100 presents a password input window on the display unit 116 and prompts the user operating the MFP 100 to input a password.

In step S406, when a password is input, the MFP 100 transfers the password to the file server. In step S407, it is determined whether the file server has made authentication successfully on the basis of the password. If the authentication has failed (NO in step S407), the flow returns to step S405. On the other hand, if the authentication has succeeded (YES in step S407), the flow advances to step S408.

If the authentication has failed in step S407, password input is requested again, but the process is not limited to this. For example, if the number of times of authentication failures exceeds a predetermined value, the attempt at authentication may be determined as operation by an invalid user, and the process itself may be stopped.

The authentication method in step S407 is not limited to one using a password. Various other authentication methods such as popular biometric authentication (e.g., fingerprint authentication), and authentication using a card can be adopted.

This authentication can be applied to a file search process (to be described below).

The same authentication can be applied to a case wherein the original electronic file cannot be found in the file server, i.e., in the series of processes in steps S129 to S132 in FIG. 3. That is, if a limitation of the access right to a given read document image is detected, the processes from step S129 are executed only when the access right is successfully authenticated. With this operation, processes executable by the image processing system can be limited for each user or each read document image, and secrecy is further enhanced.

[File Search Process]

Details of the process in step S126 of FIG. 3 will be described with reference to FIGS. 5, 10A and 10B.

Figure 10A:
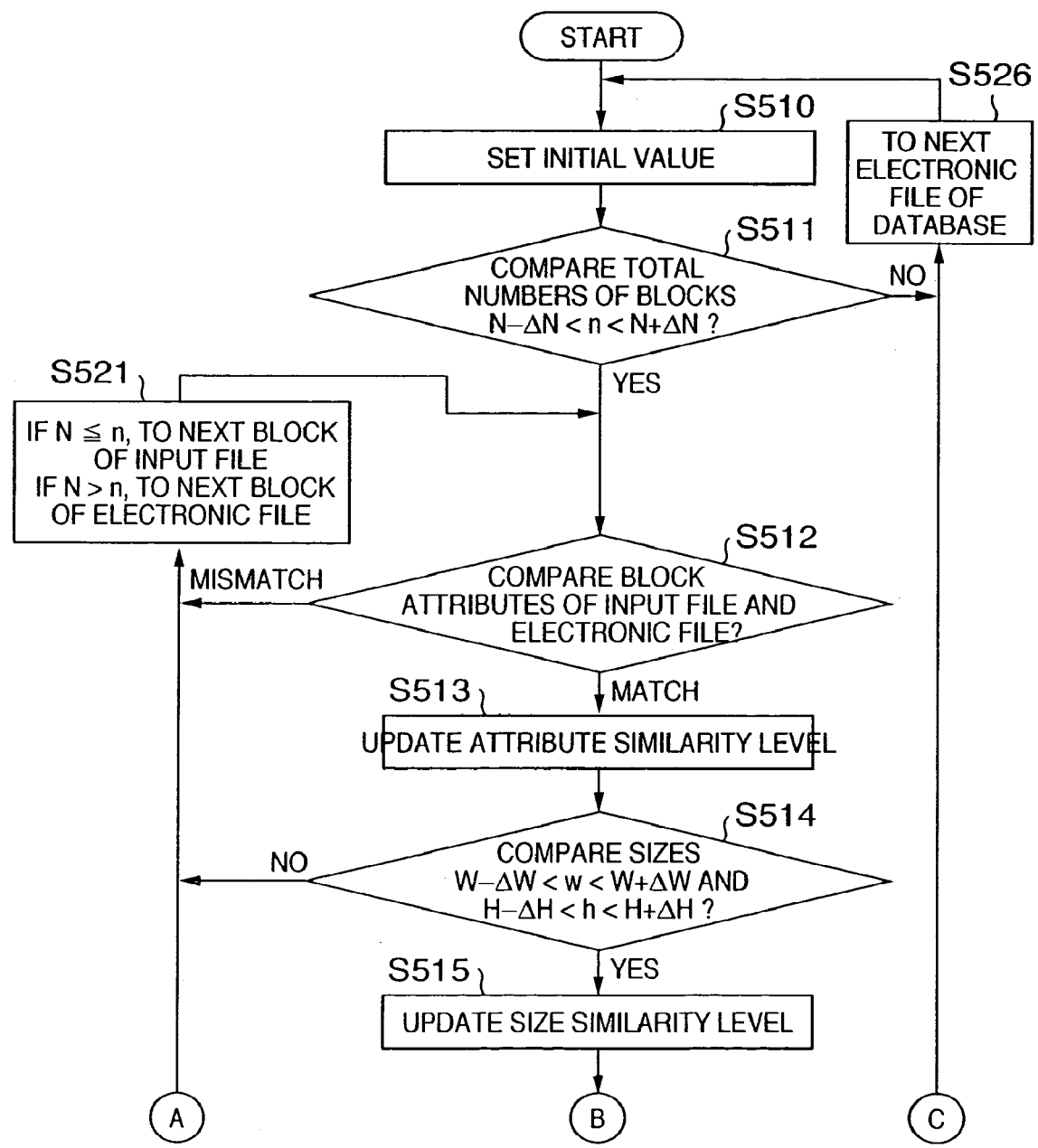
FIG. 10A is a flowchart showing details of a process in step S126 according to the embodiment of the present invention.
Figure 10B:
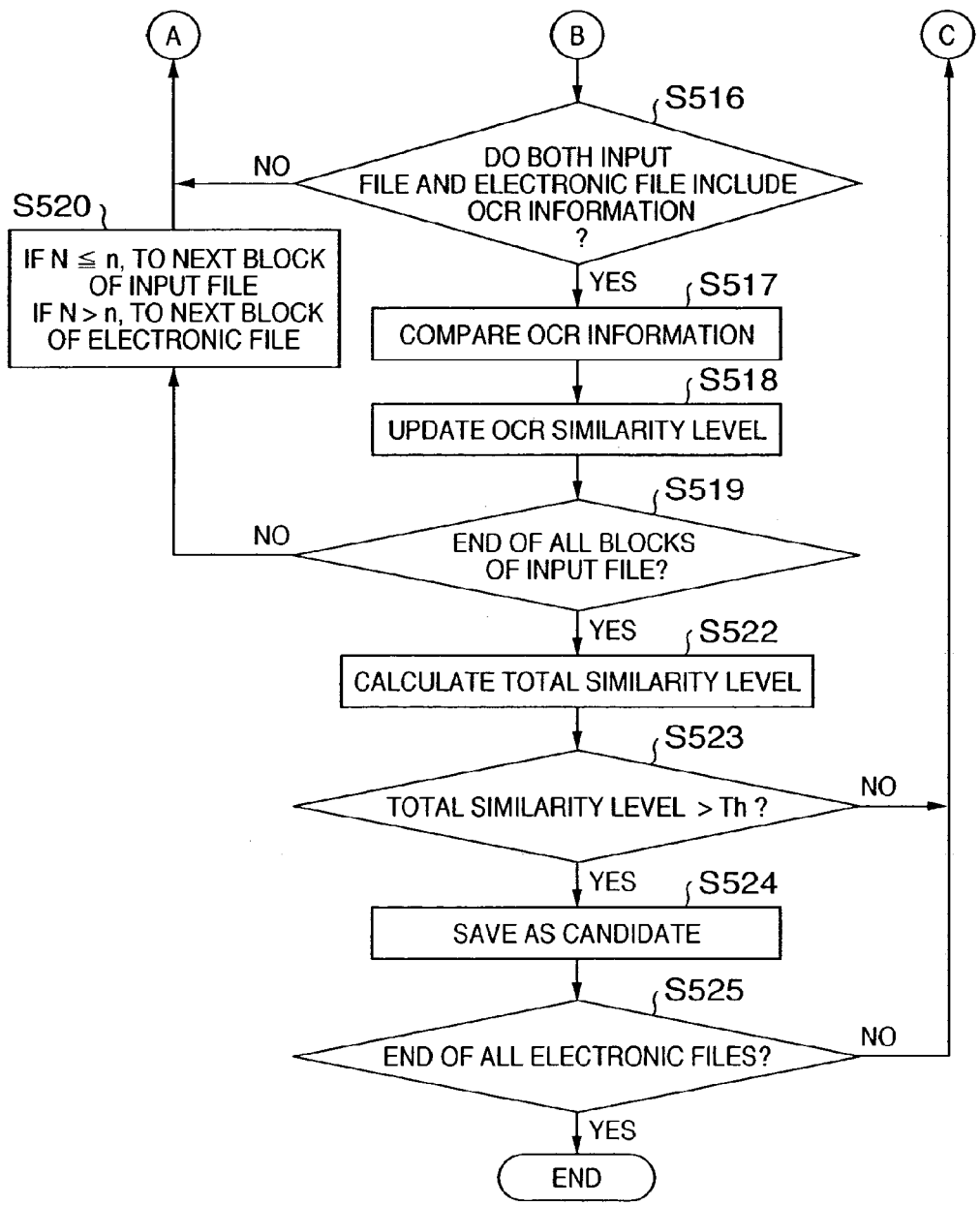
FIG. 10B is a flowchart showing details of a process in step S126 according to the embodiment of the present invention.

FIGS. 10A and 10B are flowcharts showing details of the process in step S126 according to the embodiment of the present invention.

The process in step S126 is performed if a read document image (input file) has no pointer information in step S124, if pointer information is available but no original electronic file is found, or if a found original electronic file is an image file.

Assume that the process in step S126 uses block information and input file information obtained in the process in step S122. As a specific example, the block information and input file information shown in FIG. 5 will be described. In the block information in FIG. 5, respective blocks are named and managed as blocks 1, 2, 3, 4, 5, and 6 in ascending order of coordinate X (i.e., X1<X2<X3<X4<X5<X6).

A process of searching (performing a layout search process) for an electronic file similar to an input file in the database managed by the file server using the block information and input file information will be described with reference to FIGS. 10A and 10B. Assume that electronic files managed by the database have the same kinds of block information and file information as those in FIG. 5. The layout search process is performed while sequentially comparing electronic files in the database with the input file.

In step S510, various kinds of initial values are set to calculate similarity levels and the like (to be described later). In step S511, the total numbers of blocks are compared. Let n be the total number of blocks of the input file; N, the total numbers of blocks to be compared in the database; and ΔN, an error. In this comparison, it is determined whether the conditional expression N−ΔN<n<N+ΔN is satisfied.

In step S511, if the conditional expression is not satisfied (NO in step S511), the flow advances to step S526. In step S526, the next electronic file is set as the electronic file to be processed, and the flow returns to step S510. On the other hand, if the conditional expression is satisfied (YES in step S511), comparison of the input file with the electronic file to be compared based on the block information is performed in the processes from step S512.

In step S512, the block attribute of a block to be processed of an electronic file to be compared is compared with that of a block to be processed of the input file on the basis of the block information. If the block attributes do not coincide with each other, the flow advances to step S521. In step S521, if the total number N of blocks of the electronic file to be compared≧the number n of blocks of the input file, the next block of the input file is set as the block to be processed. On the other hand, if the total number N of blocks of the electronic file to be compared<the number n of blocks of the input file, the next block of the electronic file to be compared is set as the block to be processed.

If the block attributes coincide with each other in step S512, the flow advances to step S513. In step S513, the attribute similarity level is calculated, and its value is updated.

In step S514, the size (width and height) of the block to be processed of the electronic file to be compared is compared with that of the block to be processed of the input file on the basis of the block information. Let w be the width of the block to be processed in the input file; h, the height of the block; W, the width of the block to be processed in the electronic file to be compared; ΔW, an error in the width W; H, the height of the block; and ΔH, an error in the height H. In this case, it is determined whether the conditional expressions W−ΔW<w<W+ΔW and H−ΔH<h<H+ΔH are satisfied.

In addition to the conditional expressions, comparison may be performed on the basis of the block positions (X,Y).

If the conditional expressions are not satisfied in step S514 (NO in step S514), the flow advances to step S521. On the other hand, if the conditional expressions are satisfied (YES in step S514), the flow advances to step S515. In step S515, the size similarity level is calculated, and its value is updated.

In step S516, it is determined on the basis of the block information whether the block to be processed of the input file and that of the electronic file to be compared each have OCR information. If no OCR information is present (NO in step S516), the flow advances to step S521. On the other hand, if any OCR information is found (YES in step S516), the flow advances to step S517 to compare the OCR information with each other.

In step S518, the OCR similarity level is calculated, and its value is updated. In step S519, it is determined whether all blocks in the input file have undergone the comparison process. If the comparison process has not ended (NO in step S519), the flow advances to step S520. If the total number N of blocks of the electronic file to be compared≦the number n of blocks of the input file in step S520, the next block of the input file is set as the block to be processed. On the other hand, if the total number N of blocks of the electronic file to be compared>the number n of blocks of the input file, the next block of the electronic file to be compared is set as the block to be processed.

If the comparison process has ended in step S519 (YES in step S519), the flow advances to step S522.

In step S522, the total similarity level is calculated on the basis of the similarity levels calculated in steps S513, S515, and S518.

Since a method of calculating each similarity level in step S513, S515, or S518 can use a known technique, a detailed description thereof will be omitted.

In step S523, it is determined whether the total similarity level is higher than a predetermined threshold value Th. If the total similarity level is lower than the predetermined threshold value Th (NO in step S523), the flow advances to step S526. On the other hand, if the total similarity level is higher than the predetermined threshold value Th (YES in step S523), the flow advances to step S524, and the electronic file is stored as a similar candidate of the input file.

In step S525, it is determined whether the comparison process for all electronic files in the database has ended. If the comparison process has not ended (NO in step S525), the flow advances to step S526. On the other hand, if the comparison process has ended (YES in step S525), the process ends.

With the above-mentioned process, if there is an electronic file having the total similarity level higher than the threshold value Th, that file is determined as a candidate for an electronic file similar to the input file. By outputting the candidate for the electronic file in step S127 of FIG. 3, the user can select the desired electronic file.

[Vectorized Process]

The vectorized process in step S129 of FIG. 3 will be described in detail below.

In the vectorized process, characters in a text block undergo the character recognition process.

In the character recognition process, a character image extracted for each character from a text block is recognized using one of pattern matching methods to obtain a corresponding text code. In this character recognition process, an observation feature vector obtained by converting a feature acquired from a character image into a several-ten-dimensional numerical value string is compared with a dictionary feature vector obtained in advance for each character type, and a character type with a shortest distance is output as a recognition result.

Various known methods are available for feature vector extraction. For example, a method of dividing a character into a mesh pattern, and counting character lines in respective meshes as line elements depending on their directions to obtain a (mesh count)-dimensional vector as a feature is known.

When a text block undergoes the character recognition process, the writing direction (horizontal or vertical) is determined for that text block, character strings are extracted in the corresponding directions, and characters are then extracted from the character strings to obtain character images.

Upon determining the writing direction (horizontal or vertical), horizontal and vertical projections of pixel values in that text block are calculated, and if the variance of the horizontal projection is larger than that of the vertical projection, that text block can be determined as a horizontal writing block; otherwise, that block can be determined as a vertical writing block. Upon decomposition into character strings and characters, for a text block of horizontal writing, lines are extracted using the horizontal projection, and characters are extracted based on the vertical projection for the extracted line. For a text block of vertical writing, the relationship between the horizontal and vertical parameters may be exchanged.

Note that a character size can be detected with the character recognition process.

A plurality of sets of dictionary feature vectors for the number of character types used in the character recognition process are prepared in correspondence with character shape types, i.e., font types, and a font type is output together with a text code upon matching, thus recognizing the font of a character.

Using a text code and font information obtained by the character recognition process, and outline data prepared for each text code and font, information of a text part is converted into vector data. If a document image is a color image, the color of each character is extracted from the color image and is recorded together with vector data.

With the above-mentioned processes, image information which belongs to a text block can be converted into vector data with a nearly faithful shape, size, and color.

For picture, line, and table blocks other than a text block, outlines of pixel clusters extracted in each block are converted into vector data.

Figure 11:
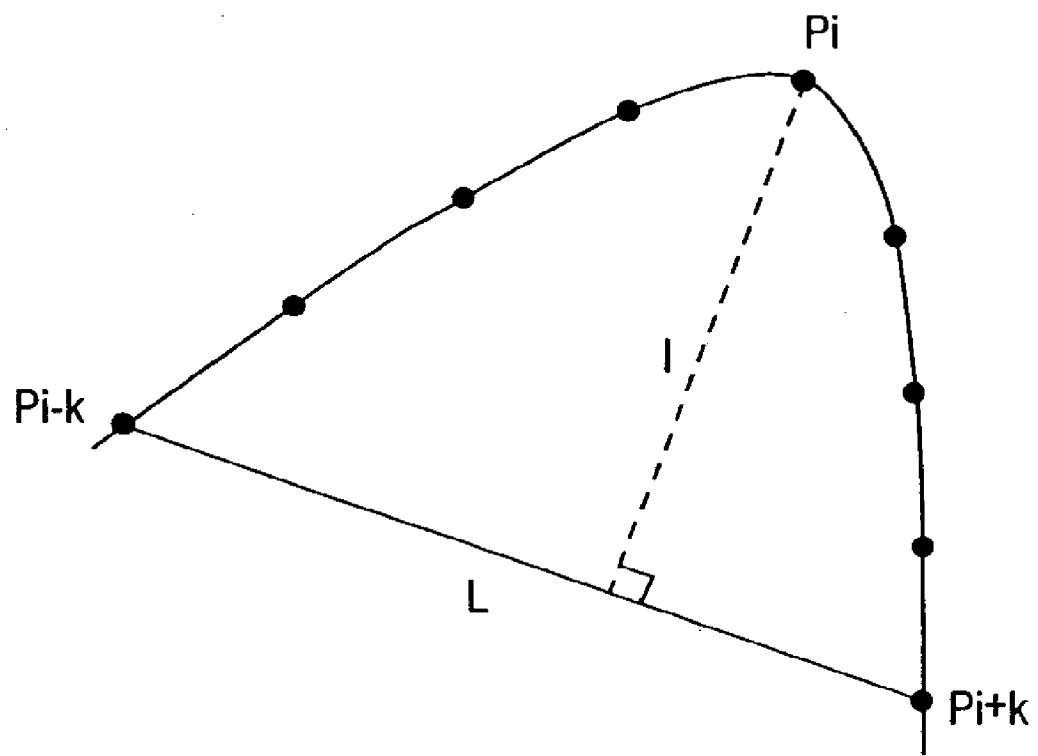
FIG. 11 is a view for explaining a vectorized process according to the embodiment of the present invention.

More specifically, a point sequence of pixels which form an outline is divided into sections at a point which is considered as a corner, and each section is approximated by a partial line or curve. The corner means a point corresponding to a maximal curvature, and the point corresponding to the maximal curvature is obtained as a point where a distance between an arbitrary point Pi and a chord which is drawn between points Pi−k and Pi+k separated k points from the point Pi in the left and right directions becomes maximal, as shown in FIG. 11.

Furthermore, let R be (chord length/arc length between Pi−k and Pi+k). Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted in the BS process.

As described above, using partial line approximation, an outline of a graphic with an arbitrary shape can be vectorized.

When a document image is a color image, the color of a graphic is extracted from the color image and is recorded together with vector data.

Figure 12:
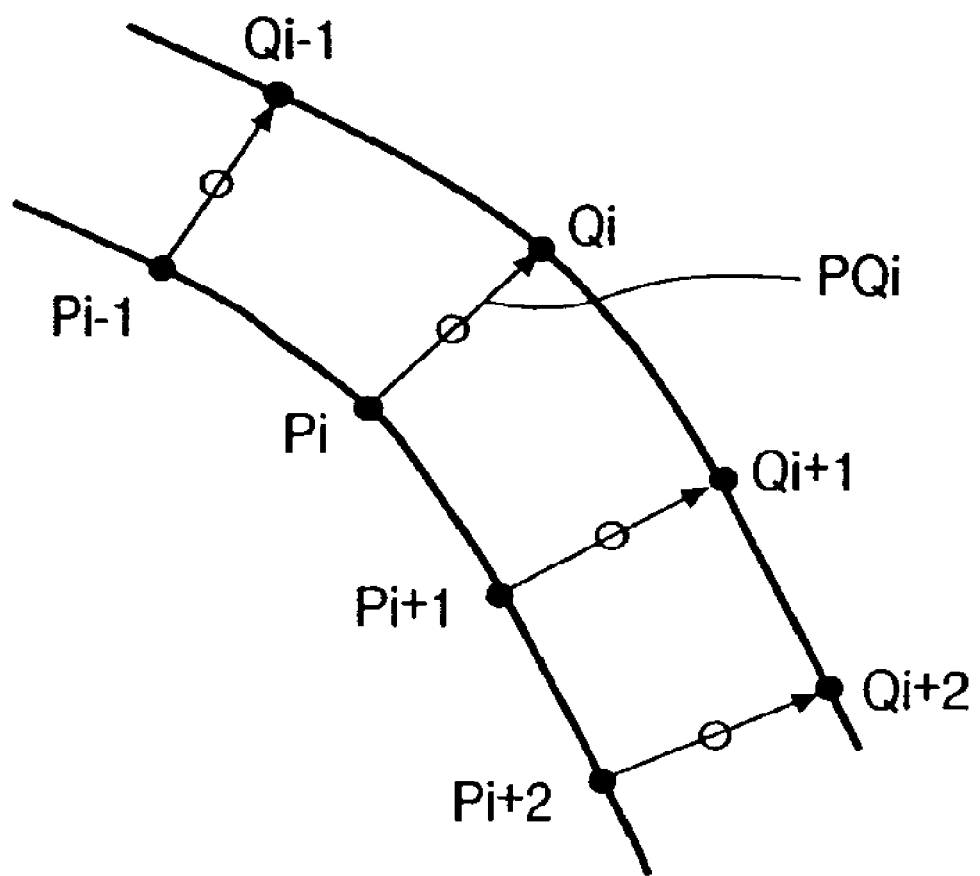
FIG. 12 is a view for explaining the vectorized process according to the embodiment of the present invention.

Furthermore, when an outside outline is close to an inside outline or another outside outline in a given section, as shown in FIG. 12, two outlines may be combined to express a line with a given width.

More specifically, lines are drawn from respective points Pi on a given outline to points Qi on another outline, each of which has a shortest distance from the corresponding point. When the distances PQi maintain a constant value or less on the average, the section of interest is approximated by a line or curve using the middle points of the distances PQi as a point sequence, and the average value of the distances PQi is set as the width of that line or curve. A line or a table ruled line as a set of lines can be efficiently vectorized as a set of lines having a given width, as described above.

Note that vectorization using the character recognition process for a text block has been explained. A character which has the shortest distance from a dictionary as a result of the character recognition process is used as a recognition result. When this distance is equal to or larger than a predetermined value, the recognition result does not always match an original character, and a wrong character having a similar shape is often recognized.

Therefore, in the present invention, such a text block is handled in the same manner as a general line image, and is converted into outline data. That is, even a character that causes a recognition error in the conventional character recognition process can be prevented from being vectorized to a wrong character, but can be vectorized based on outline data which is visually faithful to image data.

Note that a photo block is not vectorized, and is output as image data.

A grouping process of grouping vector data obtained in the vectorized process for each graphic block will be described below with reference to FIG. 13.

Figure 13:
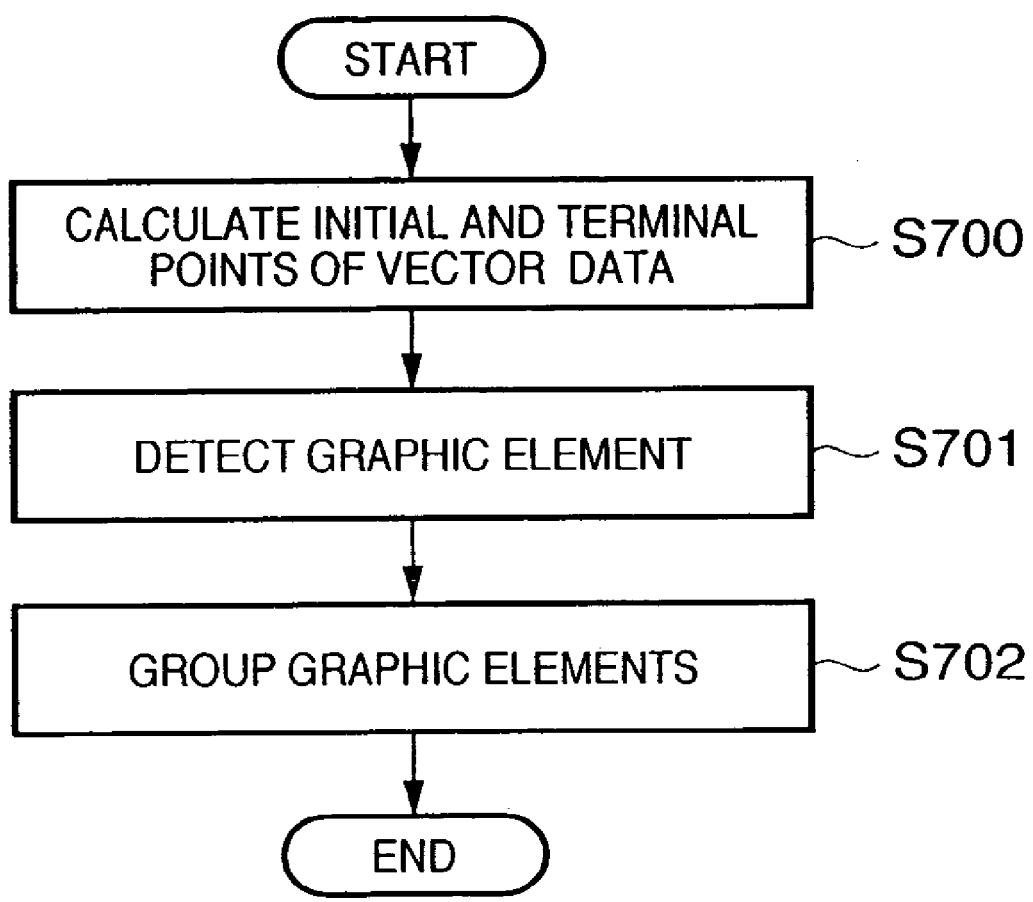
FIG. 13 is a flowchart showing a vector data grouping process according to the embodiment of the present invention.

FIG. 13 is a flowchart showing the vector data grouping process according to the embodiment of the present invention.

A process of grouping vector data for each graphic block will be described particularly with reference to FIG. 13.

In step S700, initial and terminal points of each vector data are calculated. In step S701, using the initial point information and terminal point information of respective vectors, a graphic element is detected.

Detecting a graphic element is to detect a closed graphic formed by partial lines. The detection is made by applying the principle that each vector which forms a closed shape has vectors coupled to its two ends.

In step S702, other graphic elements or partial lines present in the graphic element are grouped to set a single graphic object. If other graphic elements or partial lines are not present in the graphic element, that graphic element is set as a graphic object.

Details of the process in step S701 of FIG. 13 will be described with reference to FIG. 14.

Figure 14:
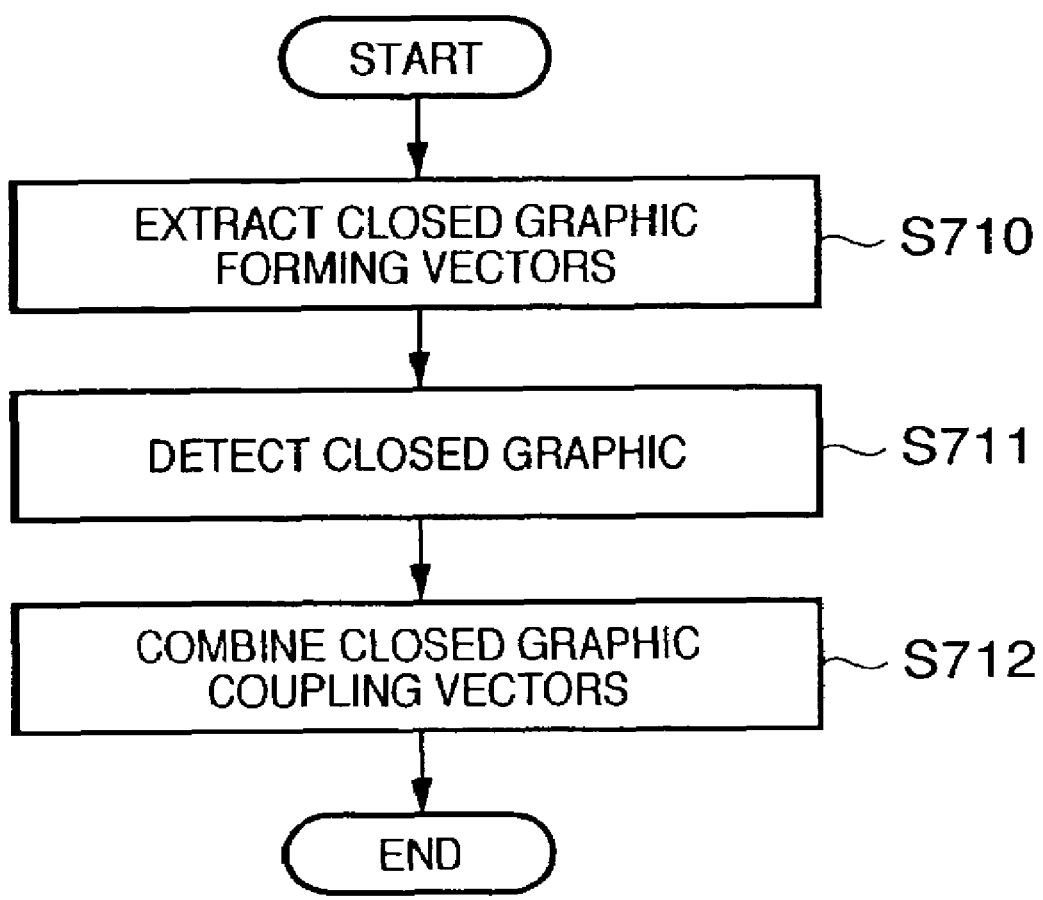
FIG. 14 is a flowchart showing details of a process in step S701 according to the embodiment of the present invention.

FIG. 14 is a flowchart showing details of the process in step S701 according to the embodiment of the present invention.

In step S710, closed graphic forming vectors are extracted from vector data by excluding unwanted vectors, two ends of which are not coupled to other vectors.

In step S711, an initial point of a vector of interest of the closed graphic forming vectors is set as a start point, and vectors are traced clockwise in turn. This process is made until the start point is reached, and all passing vectors are grouped as a closed graphic that forms one graphic element. Also, all closed graphic forming vectors present in the closed graphic are grouped. Furthermore, an initial point of a vector which is not grouped yet is set as a start point, and the same process is repeated.

Finally, in step S712, of the unwanted vectors excluded in step S710, those (closed-graphic-coupled vectors) which join the vectors grouped as the closed graphic in step S711 are detected and grouped as one graphic element.

With the above-mentioned process, a graphic block can be handled as an independently reusable graphic object.

[Application Data Convert Process]

The application data convert process in step S130 of FIG. 3 will be described in detail.

Figure 15:
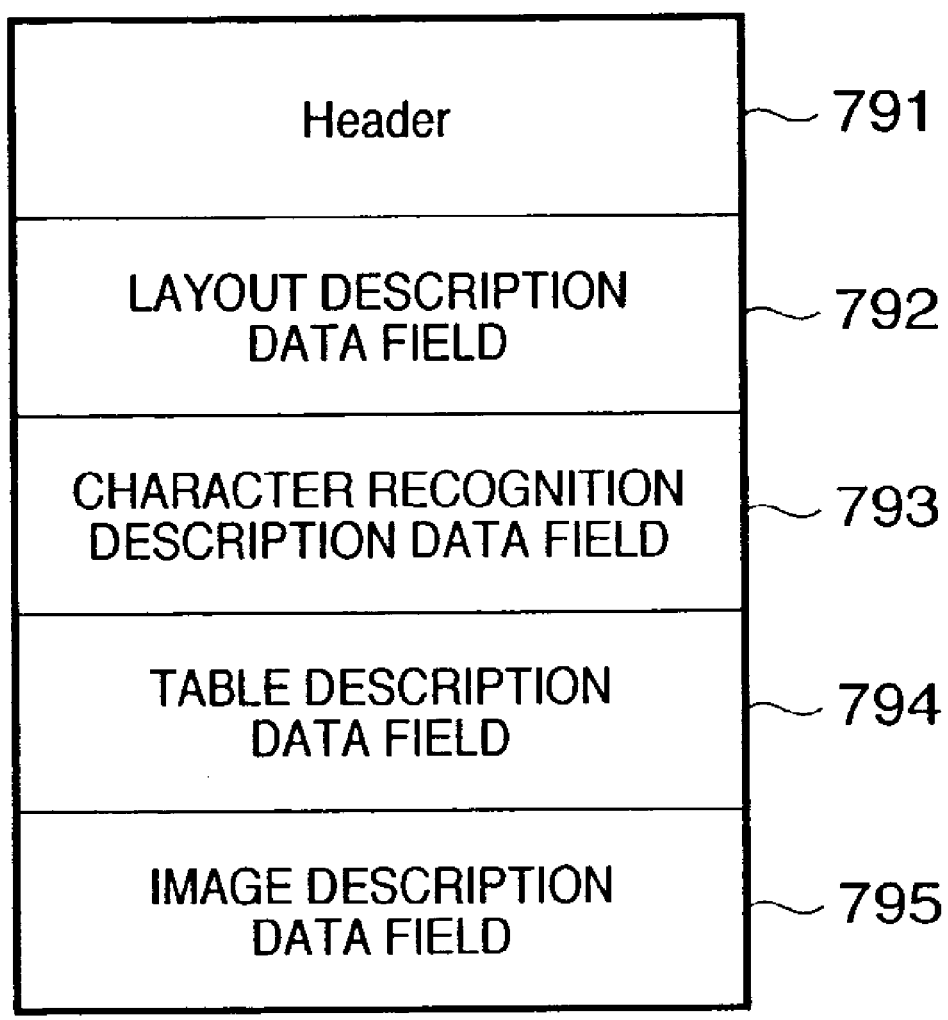
FIG. 15 is a view showing the data structure of a DAOF according to the embodiment of the present invention.

The result of the BS process in step S121 of FIG. 3 and that of the vectorized process in step S129 are converted into a file of an intermediate data format, as shown in FIG. 15. This data format is called a document analysis output format (DAOF).

The data structure of the DAOF will be described with reference to FIG. 15.

FIG. 15 is a view showing the data structure of the DAOF according to the embodiment of the present invention.

Referring to FIG. 15, a header 791 holds information associated with a document image to be processed. A layout description data field 792 holds attribute information and rectangle address information (e.g., relative coordinate information based on the relative positional relationship between blocks, or absolute position coordinates of blocks with respect to a document image) of respective blocks which are recognized for respective attributes such as TEXT (text), TITLE (title), CAPTION (caption), LINEART (line image), PICTURE (natural image), FRAME (frame), and TABLE (table).

A character recognition description data field 793 holds character recognition results obtained by performing character recognition of TEXT blocks such as TEXT, TITLE, and CAPTION.

A table description data field 794 stores details of the structure of TABLE blocks. An image description data field 795 stores image data of PICTURE blocks, LINEART blocks, and the like extracted from the document image data.

The DAOF itself is often stored as a file in place of intermediate data. However, in the state of a file, a general word processing application cannot reuse individual objects (blocks).

Hence, in the embodiment, the application data convert process (step S130) of converting the DAOF into application data which can be used by a word processing application will be described in detail with reference to FIG. 16.

Figure 16:
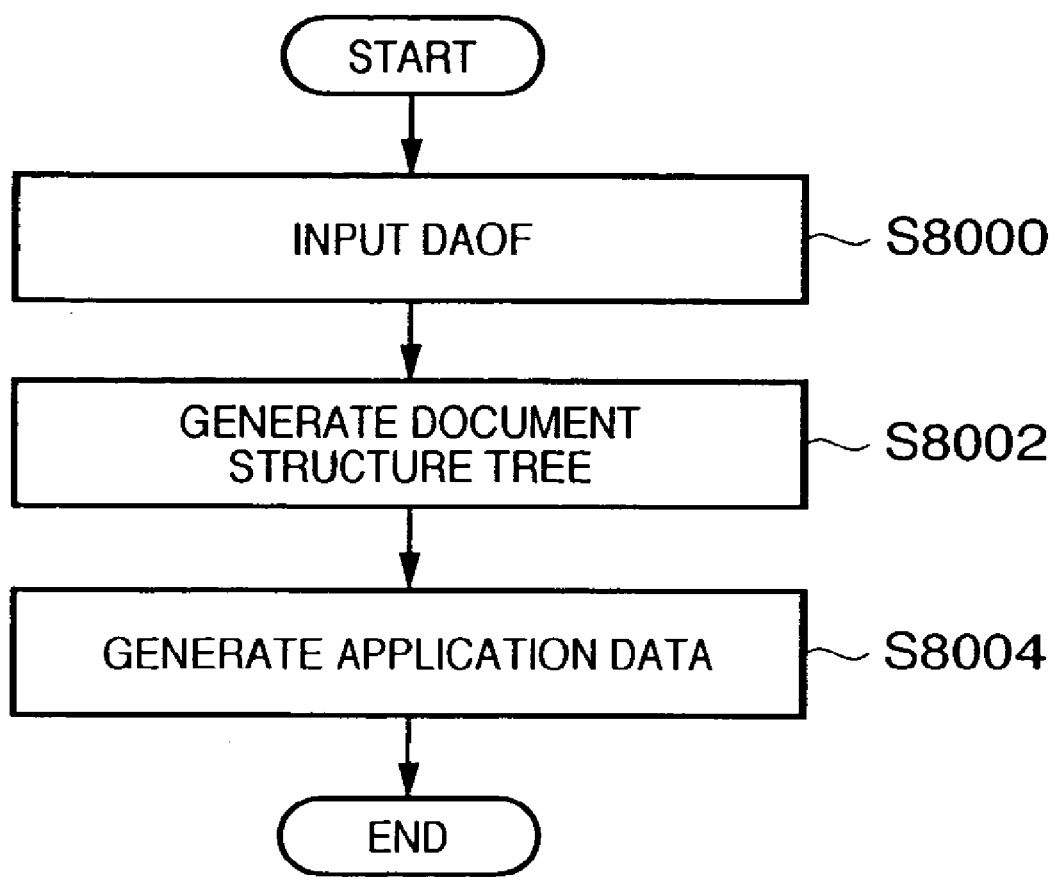
FIG. 16 is a flowchart showing details of a process in step S130 according to the embodiment of the present invention.

FIG. 16 is a flowchart showing details of the process in step S130 according to the embodiment of the present invention.

In step S8000, DAOF data is input. In step S8002, a document structure tree which serves as a basis of application data is generated. In step S8004, actual data in the DAOF are input based on the document structure tree, thus generating actual application data.

Details of the process in step S8002 of FIG. 16 will be described with reference to FIG. 17.

Figure 17:
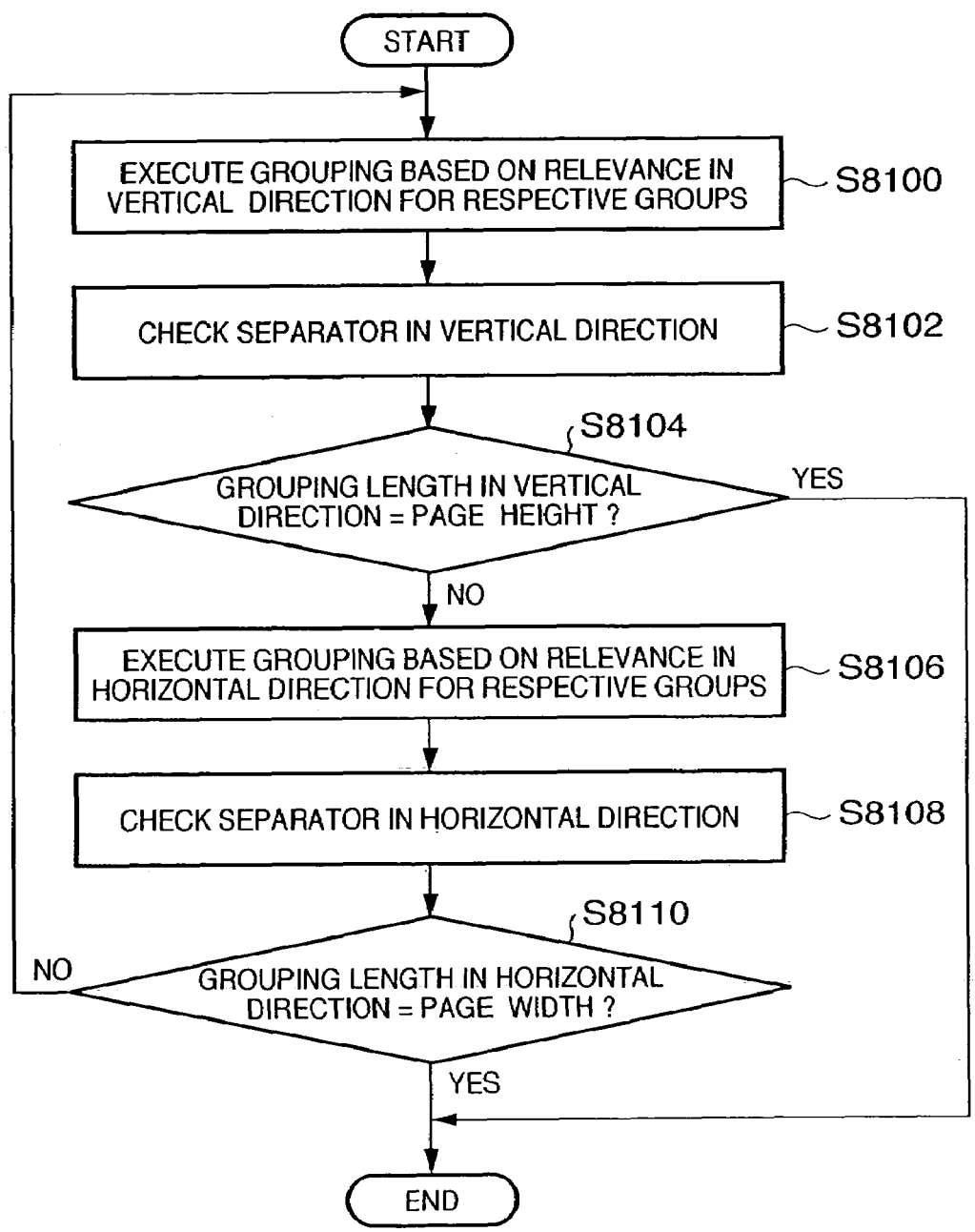
FIG. 17 is a flowchart showing details of a process in step S8002 according to the embodiment of the present invention.
Figure 18A:
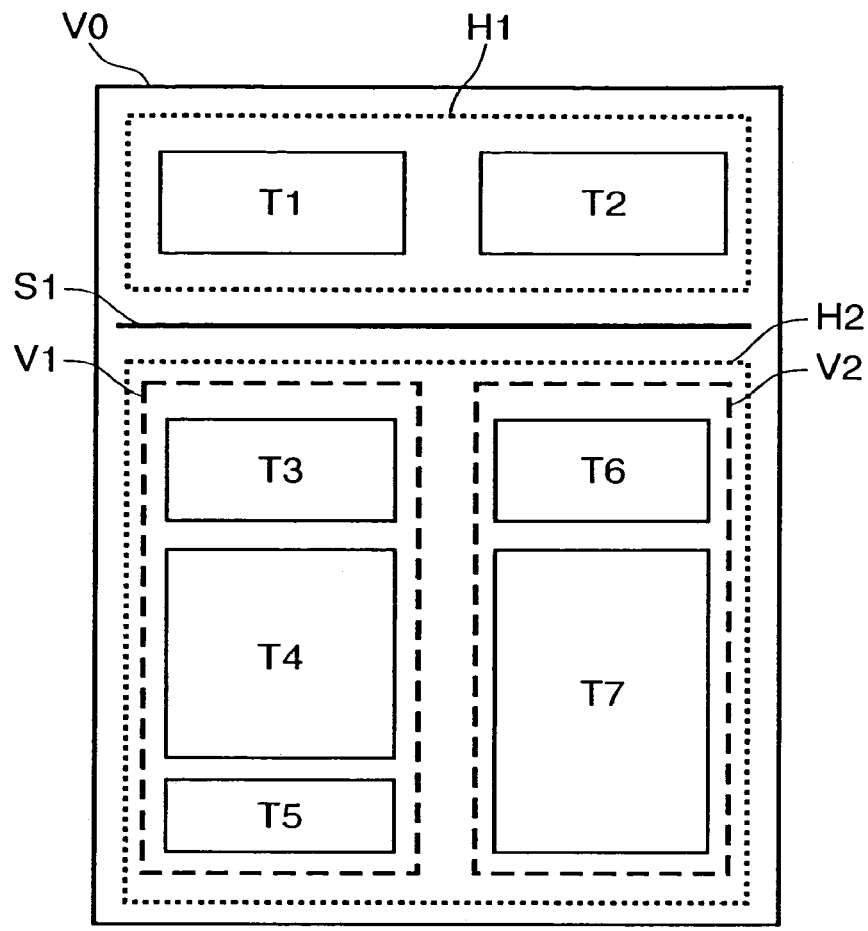
FIG. 18A is an explanatory view showing a document structure tree according to the embodiment of the present invention.
Figure 18B:
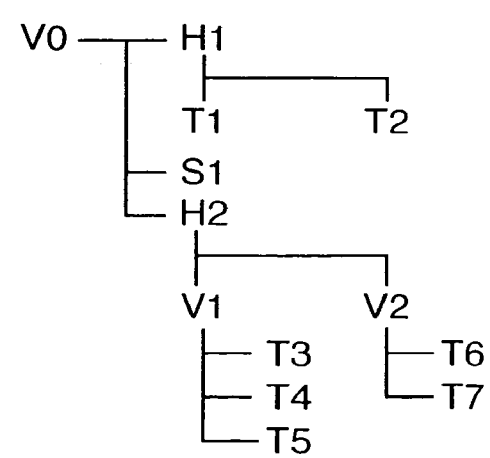
FIG. 18B is an explanatory view showing the document structure tree according to the embodiment of the present invention.

FIG. 17 is a flowchart showing details of the process in step S8002 according to the embodiment of the present invention. FIGS. 18A and 18B are explanatory views showing a document structure tree according to the embodiment of the present invention.

In the process shown in FIG. 17, as a basic rule of the overall control, the flow of process transits from a microblock (single block) to a macroblock (a set of blocks).

In this case, a block indicates a microblock and macroblock.

In step S8100, re-grouping is done for respective blocks on the basis of relevance in the vertical direction. Immediately after the flow starts, determination is made for respective microblocks.

Note that relevance can be defined by determining whether the distance between neighboring blocks is small, blocks have nearly the same block widths (heights in the horizontal direction), and the like. Information of the distances, widths, heights, and the like can be extracted with reference to the DAOF.

FIG. 18A shows the page configuration of an actual document image, and FIG. 18B shows a document structure tree of that page. As a result of the process in step S8100, blocks T3, T4, and T5 are determined to form one group V1, blocks T6 and T7 are determined to form one group V2, and these groups are generated as those which belong to an identical layer.

In step S8102, the presence/absence of a vertical separator is determined. Physically, a separator is a block which has a line attribute in the DAOF. Logically, a separator is an element which explicitly divides blocks in a word processing application. Upon detection of a separator, a group is re-divided in the identical layer.

It is then determined in step S8104 using a group length if no more divisions are present. More specifically, it is determined whether the group length in the vertical direction agrees with the page height of a document image. If the group length in the vertical direction agrees with the page height (YES in step S8104), the process ends. On the other hand, if the group length in the vertical direction does not agree with the page height (NO in step S8104), the flow advances to step S8106.

The document image in FIG. 18A has no separator, and its group lengths do not agree with the page height. Hence, the flow advances to step S8106.

In step S8106, re-grouping is done for respective blocks on the basis of relevance in the horizontal direction. In this process as well, the first determination immediately after the start is done for respective microblocks. The definitions of relevance and its determination information are the same as those in the vertical direction.

In the document image of FIG. 18A, the blocks T1 and T2 generate a group H1, and the groups V1 and V2 generate a group H2. The groups H1 and H2 are generated as those which belong to an identical layer one level higher than the groups V1 and V2.

In step S8108, the presence/absence of a separator in the horizontal direction is determined. Since FIG. 18A includes a separator S1 in the horizontal direction, that separator is registered in a document structure tree, thus generating the layers H1, S1, and H2.

It is determined in step S8110 using a group length in the horizontal direction if no more divisions are present. More specifically, it is determined whether the group length in the horizontal direction agrees with a page width. When the group length in the horizontal direction agrees with the page width (YES in step S8110), the process ends. On the other hand, if the group length in the horizontal direction does not agree with the page width (NO in step S8110), the flow returns to step S8100 to repeat the processes from step S8100 in an upper layer by one level.

In FIG. 18A, since the group length in the horizontal direction agrees with the page width, the process ends in step S8110, and an uppermost layer V0 that represents the entire page is finally appended to the document structure tree.

After the document structure tree is completed, application data is generated based on the document structure tree in step S8004 of FIG. 16.

A practical example in FIG. 18A will be explained below.

That is, since the group H1 includes the two blocks T1 and T2 in the horizontal direction, it is output as two columns. After internal information of the block T1 (with reference to the DAOF, text as the character recognition result, image, and the like) is output, a new column is set, and internal information of the block T2 is output. After that, the separator S1 is output.

Since the group H2 includes the two blocks V1 and V2 in the horizontal direction, it is output as two columns. Internal information of the block V1 is output in the order of the blocks T3, T4, and T5, and a new column is set. Then, internal information of the block V2 is output in the order of the blocks T6 and T7.

In this manner, the convert process from DAOF into application data can be done.

[Pointer Information Appending Process]

Details of the process in step S135 of FIG. 3 will be described with reference to FIG. 19.

Figure 19:
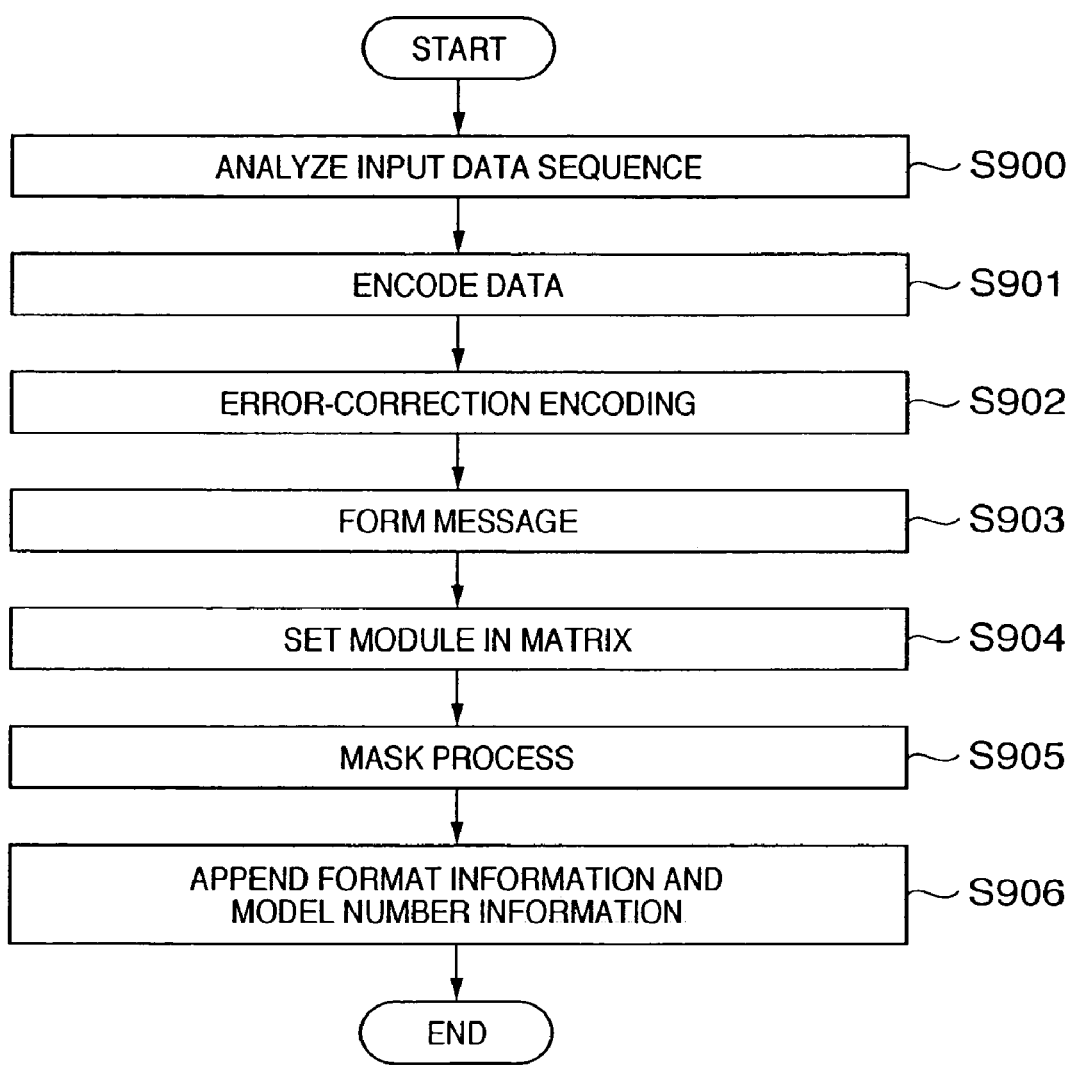
FIG. 19 is a flowchart showing details of a process in step S135 according to the embodiment of the present invention.

FIG. 19 is a flowchart showing details of the process in step S135 according to the embodiment of the present invention.

A process of encoding a data character string as pointer information by the two-dimensional barcode (QR code symbol: JIS X0510) 311 and appending the encoded data to an image will be described with reference to FIG. 19.

Data to be encoded in the two-dimensional barcode represents address information of the corresponding electronic file, which is formed from, e.g., path information including a file server name and file name. Or the address information may be formed from a URL (URI) to the corresponding electronic file, a file ID managed in the database 105 that stores the corresponding electronic file or in the storage unit 111 of the MFP 100 itself, or the like.

In step S900, in order to identify different types of characters to be encoded, an input data sequence is analyzed. Also, error detection and error correction levels are selected, and a minimum model number that can store input data is selected.

In step S901, the input data sequence is converted into a predetermined bit sequence, and an indicator indicating a data mode (numeric, alphanumeric, 8-bit byte, kanji, etc.) and an end pattern are appended as needed. Furthermore, the bit sequence is converted into predetermined bit code words.

At this time, for the purpose of error correction, in step S902, the code word sequence is divided into a predetermined number of blocks in accordance with the model number and error correction level, and error correction code words are generated for respective blocks and are appended after the data code word sequence.

In step S903, the data code words of respective blocks obtained in step S902 are connected, and the error correction code words of the blocks and if necessary, remainder code words are connected after the data code word sequence.

Next, in step S904, the code word module is set in a matrix together with a position detection pattern, separation pattern, timing pattern, alignment pattern, and the like.

In step S905, a mask pattern optimal for the symbol encoding region is selected to perform a mask process of converting the mask process pattern into the module obtained in step S904 by calculating XORs.

Finally, in step S906, type information and model number information are generated for the module obtained in step S905, thus completing a two-dimensional code symbol.

With the above-mentioned process, for example, when a corresponding electronic file from the client PC 102 is to be printed as printing data by the printing unit 112, the two-dimensional barcode that incorporates address information is converted into recordable raster data by the data processing unit 115, appended to a predetermined position on raster data of the electronic file, and printed.

By reading printed matter (document) bearing the two-dimensional barcode (pointer information) by the image reading unit 110, the storage location of the original electronic file specified by the pointer information can be detected.

For the same purpose, so-called watermarking methods including a method of directly appending pointer information to an electronic file as a character string, a method of embedding information by modulating the spacings of a character string in an electronic file (especially, the spacings between neighboring characters), and a method of embedding information in a halftone image (thumbnail image) in an electronic file, can be applied in addition to the two-dimensional barcode.

[Application for Electronic File Search]

In this embodiment, a search for an original electronic file (electronic file) corresponding to a read document image is made on the basis of pointer information in the read document image or object information (attribute information, layout, OCR information, and the like) of each object in the read document image. To more accurately search for the original electronic file, the search may be made based on both the pointer information and object information.

More specifically, even when the original electronic file is found using the pointer information in the read document image, a search based on the object information in the read document image (e.g., a layout search using the layout or a full-text search using the OCR information) is made for the original electronic file found using the pointer information. If the original electronic file is found to have high similarity level, the original electronic file is specified as a formal original electronic file.

Assume that the detection precision of the pointer information is poor, and a plurality of candidates for the original electronic file are found. With above-mentioned arrangement, the candidates for the original electronic file are further narrowed down by the search based on the object information, and the original electronic file can be specified. Thus, high-speed and high-precision specifying operation can be implemented.

[Application of Vectorized Process]

In the embodiment, if an original electronic file or electronic file corresponding to a read document image cannot be specified, the vectorized process is performed for the entire read document image, but the present invention is not limited to this process. In some cases, all objects in a read document image to be processed are not newly created, and some of them are diverted from another existing electronic file.

For example, several patterns of background objects (wall papers) are prepared in a word processing application, and one of them is generally selected and used. Such a background object is highly likely to be present in an existing electronic file in a file server and is also highly likely to be present as reusable vector data.

For this reason, as another example of the vectorized process in step S129 of FIG. 3, an electronic file containing an object to be processed out of separate objects obtained in the block selection process may be searched for in the file server. If any electronic file is found, vector data may be obtained for each object from the found electronic file.

With this arrangement, the vectorized process need not be performed for the entire read document image. This makes it possible to perform the vectorized process at a higher speed and prevent degradation in image quality due to the vectorized process.

On the other hand, if an electronic file found in the search process in the step of FIG. 3 is a PDF file, the PDF file may have text codes having undergone character recognition as an additional file for a text object in the PDF file. When the vectorized process is applied to the PDF file, the additional file (text code file) is used. As a result, the character recognition process to be performed as part of the process in step S129 can be skipped, and the vectorized process can be performed at a higher speed.

The basic arrangement and basic operation of the image processing system according to the present invention have been described with reference to FIGS. 1 to 19.

The characteristic arrangement of the present invention will be explained below.

The above-described document image vectorized process basically targets each document image corresponding to one document, but is not limited to this. For example, according to a feature of the present invention, the vectorized process (batch vectorized process) is executed at once for a plurality of document images in order to mutually use pieces of information of the document images that are obtained by reading the documents. In the batch vectorized process, the processing method can be properly set in accordance with the application purpose of the user.

An arrangement which implements the batch vectorized process will be explained with reference to FIG. 20.

Figure 20:
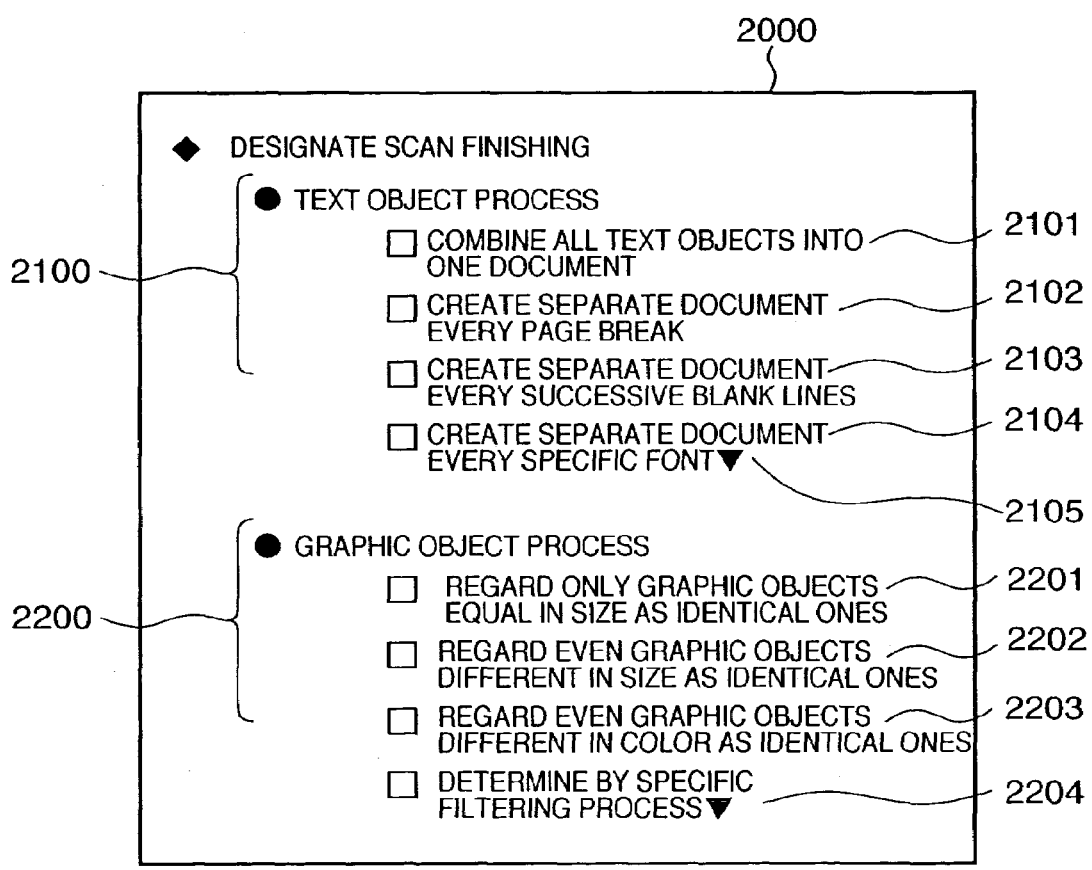
FIG. 20 is a view showing an example of an operation window for executing a batch vectorized process according to the embodiment of the present invention.

FIG. 20 is a view showing an example of an operation window for executing the batch vectorized process according to the embodiment of the present invention.

An operation window 2000 in FIG. 20 is formed from a window for designating a processing method when the batch vectorized process is to be executed. Before an image is input in step S120 of FIG. 3, the user can invoke the operation window 2000 onto the display unit 116 via the input unit 113 and designate a processing method associated with the batch vectorized process via the operation window.

In the operation window 2000, a region 2100 provides check boxes for selecting a method of processing text objects in document images in the batch vectorized process. A region 2200 provides check boxes for selecting a method of processing graphic objects in document images in the batch vectorized process.

Check boxes 2101 to 2104 in the region 2100 are used to designate a method of outputting a series of text vector data (including text codes and font information) obtained by performing the OCR process for text objects in a plurality of document images that are obtained by performing the batch vectorized process for the document images.

The check box 2101 is checked when a series of text vector data (including a series of text blocks over a plurality of documents) corresponding to text objects in document images is output at once as one text vector data file.

The check box 2102 is checked when the positions of page breaks (each corresponding to one document image in general) of document images are set as the dividing positions of a series of text vector data corresponding to text objects in the document images. In this case, the series of text vector data is divided at break positions serving as dividing positions, and is output as separate text vector data files.

The check box 2103 is checked when the positions each of a predetermined number of successive blank lines in document images are set as the dividing positions of a series of text vector data corresponding to text objects in the document images. In this case, the series of text vector data is divided at, as dividing positions, the positions each of a predetermined number of successive blank lines, and is output as separate text vector data files.

The check box 2104 is checked when positions corresponding to font type information designated in document images are set as the dividing positions of a series of text vector data corresponding to text objects in the document images. In this case, the series of text vector data is divided at, as dividing positions, positions corresponding to designated font type information, and is output as separate text vector data files.

To designate a font, a button 2105 is designated to display a font type information designation window 3000 in FIG. 21 (FIG. 22), and font type information can be designated as the dividing positions of the series of text vector data.

The font type information designation window 3000 will be explained with reference to FIG. 21.

FIG. 21 is a view showing an example of the font type information designation window according to the embodiment of the present invention.

In the font type information designation window 3000, for example, the font size, color, decoration (character decoration), and code can be designated as font type information. In addition, the present invention can design an arrangement which allows designating various kinds of information on the font in accordance with the application purpose as far as the information pertains to the font.

In the font type information designation window 3000, a field 3100 is a size designation field, and allows the user to designate the font size. A field 3200 is a font color designation field, and allows the user to designate the font color by using, e.g., a color palette. A field 3300 is a decoration field, and allows the user to designate the character decoration of the font (e.g., boldface (B), italic (I), and underline (U)). A field 3400 is a code designation field, and allows the user to designate an arbitrary font code (e.g., "+§")

Font type information can be designated as at least one or an arbitrary combination of the font size, color, decoration, and code.

By using the user operation window 2000, the output method and editing of a series of text vector data obtained by the batch vectorized process can be designated to process the series of text vector data at once. The dividing condition (dividing position) used to divide a series of vector data and output the divided data to separate vector data files is not limited to the page break or a predetermined number of blank lines, and various conditions can be set in accordance with the application purpose (for example, for a document image with a multiple-column layout, each paragraph is defined as a dividing condition). As a method of determining text blocks over pages as a series of blocks in the batch vectorized process, various methods can be adopted: for example, whether a subsequent text exists is determined by determining the context. A determination error may also occur, and the determination result may be corrected by the user.

Conceivable examples of the output destination of text vector data are registration in step S134 of FIG. 3, and edit/storage/transmission (FAX transmission, e-mail transmission, or file transmission)/printing in step S136. The batch vectorized process can be applied to image data input by various methods, such as image data photographed by a digital camera and image data received via a telephone line or network, in addition to an input document image read by a scanner.

A region 2200 in the user operation window 2000 enables the user to designate a method of processing a series of graphic vector data obtained by the batch vectorized process.

Check boxes 2201 to 2204 in the region 2200 are used to designate a method of registering a series of graphic vector data corresponding to graphic objects in a plurality of document images that are obtained by performing the batch vectorized process for the document images.

The check box 2201 is checked when identical graphic vector data among a series of graphic vector data corresponding to graphic objects in document images are registered with the same block ID.

The check box 2202 is checked when, of a series of graphic vector data corresponding to graphic objects in document images, graphic vector data having different sizes but the same contents are registered with the same block ID. In this case, size information is also managed for graphic vector data which are managed with the same block ID, in order to output for reuse the graphic vector data with their original sizes in the process.

The check box 2203 is checked when, of a series of graphic vector data corresponding to graphic objects in document images, graphic vector data having different colors but the same contents are registered with the same block ID. In this case, color information is also managed for graphic vector data which are managed with the same block ID, in order to output, for reuse, the graphic vector data with their original colors in the process.

The check box 2204 is checked when, of a series of graphic vector data corresponding to graphic objects in document images, graphic vector data determined to be identical by a specific filtering process are registered with the same block ID. In this case, block information is also managed for graphic vector data which are managed with the same block ID, in order to output, for reuse, the graphic vector data with their original contents in the process.

Since identical graphic vector data among a plurality of document images are managed with the same block ID, the total data amount of managed graphic vector data can be reduced. In other words, when a plurality of identical graphic vector data exist, one of them is registered, and only reference information (or block IDs) used to refer to the registration position of the registered identical vector data is registered as block information corresponding to the remaining identical vector data. This can reduce the total data amount of registered graphic vector data.

Whether identical graphic vector data exist in a plurality of document images can be determined by comparing the contents of newly created graphic vector data with those of existing graphic vector data every time graphic vector data of each document image is created.

Determination of whether identical graphic vector data exist can be easily achieved because the contents of identical image data completely coincide with each other when document images to be processed are image data such as electronic data (e.g., PDL data) whose contents do not change.

To the contrary, when document images to be processed are read ones, the user can determine that they are identical, but the apparatus may determine that they are different owing to an error in the read environment. In order to give a certain allowable range to the color and size, a comparison between graphic vector data adopts an arrangement (check box 2204) for applying a specific filtering process and then determining whether identical graphic vector data exist.

The specific filtering process includes, for example, a noise removal process, an undercolor removal process, an automatic adjustment process for the skew of a document image, and a color conversion process. After these processes, automatic determination of whether identical graphic vector data exist is executed. The process contents of the specific filtering process are designated using, e.g., a dedicated designation window (not shown).

A concrete example of operation via the operation window 2000 will be explained with reference to FIGS. 22 to 25.

FIGS. 22 to 25 are views showing output examples by operation via the operation window according to the embodiment of the present invention.

FIG. 22 shows an example of text vector data output when the check box 2101 ("combine all text objects into one document") is checked in the operation window 2000 for target document images (read document images or original electronic data (e.g., PDL data)) 4100 and 4200.

In this case, when the batch vectorized process is done for the images 4100 and 4200, a series of text vector data corresponding to character strings in these images is output as one text vector data file 4300.

FIG. 23 shows an example of text vector data output when the check box 2102 ("create a separate document every page break") is checked in the operation window 2000 for the target document images (read document images or original electronic data (e.g., PDL data)) 4100 and 4200.

In this case, when the batch vectorized process is performed for the images 4100 and 4200, a series of text vector data corresponding to character strings in these images is divided every time the image switches (every page break code when the image is PDL data), and text vector data files 4400 and 4500 are output.

Figure 24:
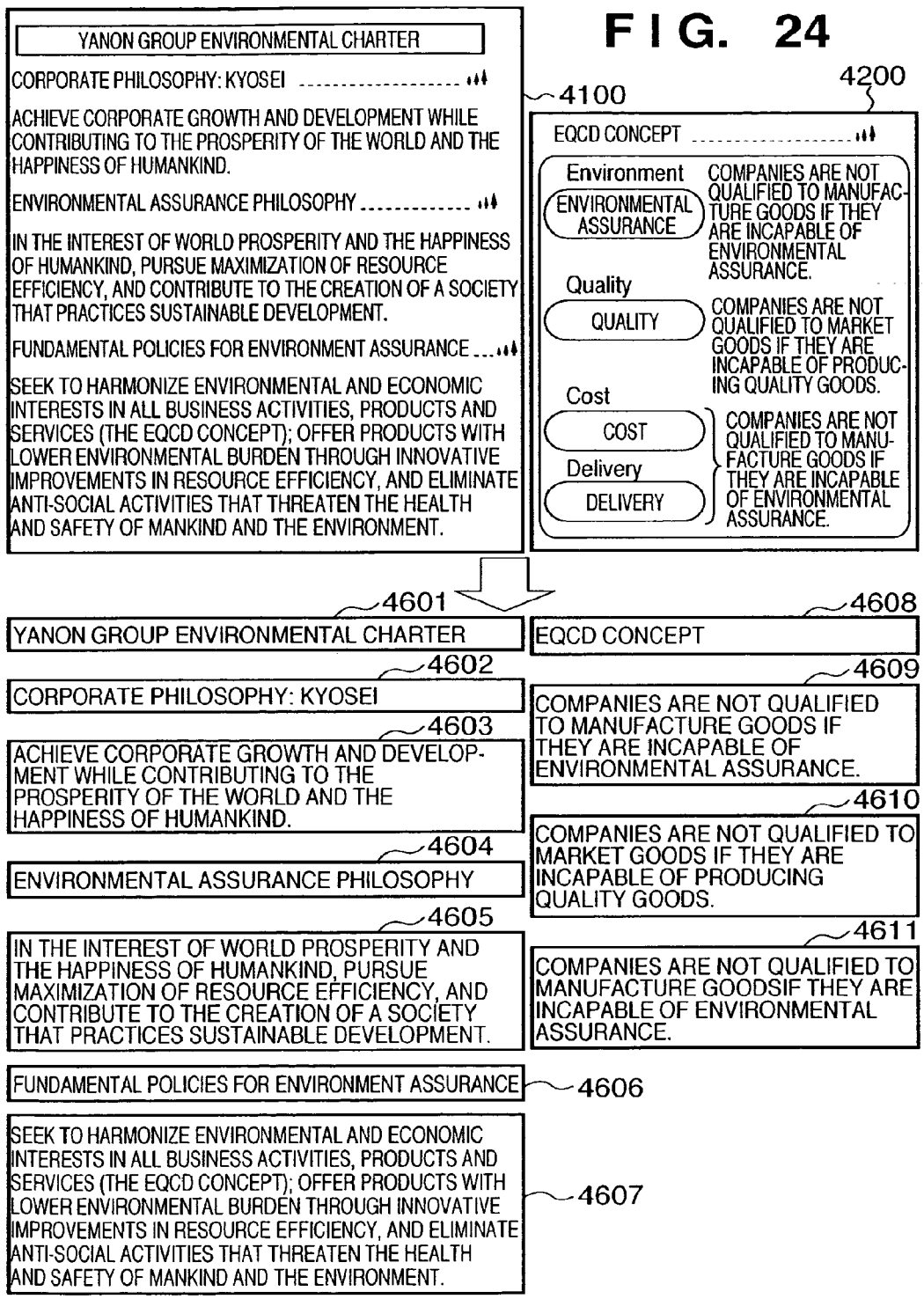
FIG. 24 is a view showing still another output example by operation via the operation window according to the embodiment of the present invention.

FIG. 24 shows an example of text vector data output when the check box 2103 ("create a separate document every successive blank lines") is checked in the operation window 2000 for the target document images (read document images or original electronic data (e.g., PDL data)) 4100 and 4200.

In this case, when the batch vectorized process is performed for the images 4100 and 4200, a series of text vector data corresponding to character strings in these images is divided every time a predetermined number of successive blank lines (e.g., one line) or more appear in the images, thereby outputting text vector data files 4601 to 4611.

FIG. 25 shows an example of text vector data output when the check box 2104 ("create a separate document every specific font") is checked in the operation window 2000 for the target document images (read document images or original electronic data (e.g., PDL data)) 4100 and 4200.

In this case, when the batch vectorized process is performed for the images 4100 and 4200, a series of text vector data corresponding to character strings in these images is divided every time designated font type information (e.g., an arbitrary combination of the number of points, color, decoration, and text code) appears in the images, thereby outputting text vector data files 4701 to 4711.

Note that the batch vectorized process is executed in step S129 upon operation via the operation window 2000. In this case, pieces of block information of blocks in a plurality of document images to be processed are stored in the storage unit 111 in correspondence with the respective document images.

In executing the batch vectorized process, vector data output by operation via the operation window 2000 is subjected to the process in step S136. For example, when the check box 2101 is checked in the operation window 2000 and printing is designated in step S136, printing of one obtained text vector data is executed.

In FIG. 20, the target of the batch vectorized process is text objects in a plurality of document images. The batch vectorized process can also be applied to objects of other predetermined attributes (e.g., graphic objects or photo objects).

For example, graphic objects in a plurality of document images can be output as one graphic vector data file by using the operation window 2000.

In addition, the batch vectorized process can also be applied to objects of two or more attributes or all attributes.

As has been described above, according to the embodiment, a method of outputting a series of vector data corresponding to objects of a predetermined attribute in a plurality of document images can be arbitrarily designated in accordance with the application purpose of the user by performing the batch vectorized process for these document images.

The present invention can, therefore, implement a more convenient image processing system which can provide the user with various output forms for a series of vector data corresponding to objects of a desired attribute in a plurality of document images.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-186476 filed on Jun. 24, 2004, the entire contents of which are hereby incorporated by reference herein.

What is claimed is:

1. An image processing apparatus which performs an image process for a plurality of document image obtained by reading a document, comprising:
a designating unit, adapted to designate one of a plurality of output methods, the plurality of output methods including at least a first output method which outputs a series of vector data as one vector file, and a second output method which outputs a plurality of vector files by dividing the series of vector data on the basis of a dividing condition, wherein the series of vector data is obtained from a plurality of objects included in a plurality of document images, the objects having a predetermined attribute;
a reading unit, adapted to obtain a plurality of document images by reading a plurality of documents;
a converting unit, adapted to convert the plurality of objects included in the obtained plurality of document images into the series of vector data, the objects having the predetermined attribute; and
an output unit, adapted to output the series of vector data obtained by said converting unit as one vector data file when said designating unit designates the first output method, and to output the series of vector data obtained by said converting unit as a plurality of vector files by dividing the series of vector data on the basis of the dividing condition when said designating unit designates the second output method.

2. The apparatus according to claim 1, wherein the predetermined attribute includes one of a text and an image.

3. The apparatus according to claim 1, wherein when the predetermined attribute is a text, said converting unit comprises a character recognizing unit, adapted to recognize a text image in a text block having the text attribute in the document image.

4. The apparatus according to claim 1, wherein the dividing condition includes a page break position.

5. The apparatus according to claim 1, wherein the dividing condition includes a position of not less than a predetermined number of blank lines in the document image.

6. The apparatus according to claim 1, wherein the dividing condition includes a position corresponding to designated font type information.

7. The apparatus according to claim 6, wherein the font type information includes at least one of a font size, a color, decoration, and a code.

8. The apparatus according to claim 1, further comprising:
a dividing unit, adapted to divide the document image into a plurality of blocks surrounding the objects having the predetermined attributes;
a generating unit, adapted to generate block information including an ID which specifies each of the blocks divided by said dividing unit; and
a storage unit, adapted to store the block information generated by said generating unit.

9. The apparatus according to claim 8, wherein the block information includes relative position information of a block with respect to another block.

10. The apparatus according to claim 8, wherein the block information includes absolute position coordinates of a block with respect to a document image including the block.

11. The apparatus according to claim 8, wherein the block information includes an order of a block with respect to all blocks in a document image including the block.

12. The apparatus according to claim 8, further comprising an image output unit, adapted to output an image corresponding to the document image by using the block information stored in said storage unit.

13. The apparatus according to claim 8, wherein when a plurality of blocks determined as identical blocks exist in the document image, said generating unit generates first block information for one identical block among the plurality of identical blocks, and for the remaining identical blocks, generates second block information containing reference information used to refer to the first block information.

14. A method of controlling an image processing apparatus which performs an image process for a plurality of document images obtained by reading a document, comprising:
a designating step of designating one of plurality of output methods, the plurality of output methods including at least a first output method which outputs a series of vector data as one vector file, and a second output method which outputs a plurality of vector files by dividing the series of vector data on the basis of a dividing condition, wherein the series of vector data is obtained from a plurality of objects included in a plurality of document images, the objects having a predetermined attribute;
a reading step of obtaining a plurality of document images by reading a plurality of documents;
a converting step of converting the plurality of objects included in the obtained plurality of document images into the series of vector data, the objects having the predetermined attribute; and
an output step of outputting the series of vector data obtained in said converting step as one vector data file when the first output method is designated in said designating step, and outputting the series of vector data obtained in said converting step as a plurality of vector files by dividing the series of vector data on the basis of the dividing condition when the second output method is designated in said designating step.

15. A computer readable medium encoded with a computer program for implementing control of an image processing apparatus which performs an image process for a plurality of document images obtained by reading a document, comprising:

a program code for a designating step of designating one of a plurality of output methods, the plurality of output methods including at least a first output method which outputs a series of vector data as one vector file, and a second output method which outputs a plurality of vector files by dividing the series of vector data on the basis of a dividing condition, wherein the series of vector data is obtained from a plurality of objects included in a plurality of document images, the objects having a predetermined attribute;

a program code for a reading step of obtaining a plurality of document images by reading a plurality of documents;

a program code for a converting step of converting the plurality of objects included in the obtained plurality of document images into the series of vector data, the objects having the predetermined attribute; and a program code for an output step of outputting the series of vector data obtained in said converting step as one vector data file when the first output method is designated in said designating step, and outputting the series of vector data obtained in said converting step as a plurality of vector files by dividing the series of vector data on the basis of the dividing condition when the second output method is designated in said determining step.

* * * * *